US009282399B2

(12) United States Patent
Kim et al.

(10) Patent No.: US 9,282,399 B2
(45) Date of Patent: Mar. 8, 2016

(54) LISTEN TO PEOPLE YOU RECOGNIZE

(71) Applicant: QUALCOMM Incorporated, San Diego, CA (US)

(72) Inventors: Lae-Hoon Kim, San Diego, CA (US);
Phuong Lam Ton, San Diego, CA (US);
Erik Visser, San Diego, CA (US);
Jeremy P. Toman, San Diego, CA (US);
Francis Bernard MacDougall, Milton (CA)

(73) Assignee: QUALCOMM INCORPORATED, San Diego, CA (US)

( * ) Notice: Subject to any disclaimer, the term of this patent is extended or adjusted under 35 U.S.C. 154(b) by 190 days.

(21) Appl. No.: 14/191,321

(22) Filed: Feb. 26, 2014

(65) Prior Publication Data
US 2015/0245133 A1 Aug. 27, 2015

(51) Int. Cl.
*H04R 1/32* (2006.01)
*G10L 15/25* (2013.01)
*G06K 9/00* (2006.01)
*G10L 21/02* (2013.01)
*H04N 7/14* (2006.01)
*G10L 21/0216* (2013.01)

(52) U.S. Cl.
CPC ............ *H04R 1/326* (2013.01); *G06K 9/00315* (2013.01); *G10L 15/25* (2013.01); *G10L 21/02* (2013.01); *H04N 7/147* (2013.01); *G06K 9/00221* (2013.01); *G10L 2021/02166* (2013.01)

(58) Field of Classification Search
None
See application file for complete search history.

(56) References Cited

U.S. PATENT DOCUMENTS

| 5,664,021 A | 9/1997 | Chu et al. |
|---|---|---|
| 7,130,705 B2 | 10/2006 | Amir et al. |
| 7,689,413 B2 | 3/2010 | Hershey et al. |
| 9,119,012 B2 * | 8/2015 | Ikizyan .................... H04R 3/00 |
| 9,131,295 B2 * | 9/2015 | Kim .................... G10L 21/0272 |
| 2010/0026780 A1 | 2/2010 | Tico et al. |
| 2011/0093273 A1 | 4/2011 | Lee et al. |
| 2012/0155703 A1 | 6/2012 | Hernandez-Abrego et al. |
| 2012/0163625 A1 * | 6/2012 | Siotis ..................... H04R 3/005 |
| | | 381/92 |
| 2013/0028443 A1 | 1/2013 | Pance et al. |

FOREIGN PATENT DOCUMENTS

| EP | 2428951 A2 | 3/2012 |
|---|---|---|
| WO | WO-2013155154 A1 | 10/2013 |

OTHER PUBLICATIONS

Bub, U., et al., "Knowing Who to Listen to in Speech Recognition: Visually Guided Beamforming", 1995 International Conference on Acoustics, Speech, and Signal Processing, May 1995, vol. 1, pp. 848-851.
International Search Report and Written Opinion—PCT/US2015/014959—ISA/EPO—May 13, 2015.

* cited by examiner

*Primary Examiner* — Paul Huber
(74) *Attorney, Agent, or Firm* — Kilpatrick Townsend & Stockton LLP

(57) ABSTRACT

Systems, devices, and methods are described for recognizing and focusing on at least one source of an audio communication as part of a communication including a video image and an audio communication derived from two or more microphones when a relative position between the microphones is known. In certain embodiments, linked audio and video focus areas providing location information for one or more sound sources may each be associated with different user inputs, and an input to adjust a focus in either the audio or video domain may automatically adjust the focus in the another domain.

30 Claims, 14 Drawing Sheets

LISTEN TO PEOPLE YOU RECOGNIZE

FIELD

Aspects of the disclosure relate to electronic communications, and in particular, to systems and methods for recognizing and focusing on at least one source of an audio communication as part of a communication including a video image and an audio communication derived from two or more microphones when a relative position between the microphones is known.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions more quickly, more efficiently or with higher quality are often sought after.

Some electronic devices (e.g., cellular phones, smart phones, computers, etc.) use audio or speech signals. These electronic devices may code speech signals for storage or transmission. For example, a cellular phone captures a user's voice or speech using a microphone. The microphone converts an acoustic signal into an electronic signal. This electronic signal may then be formatted (e.g., coded) for transmission to another device (e.g., cellular phone, smart phone, computer, etc.) for playback or for storage.

Noisy audio signals may pose particular challenges. For example, competing audio signals may reduce the quality of a desired audio signal. As can be observed from this discussion, systems and methods that improve audio signal quality in an electronic device may be beneficial.

BRIEF SUMMARY

Embodiments described herein include systems, methods, devices, and computer readable media for improving audio signals and providing directional location information about the source of an audio communication received at a device.

One potential embodiment may be a method comprising processing, at a first mobile computing device, video image and an audio communication associated with the video image, wherein the audio communication comprises at least two raw electronic audio signals created from at least two separate microphones, and wherein a relative position of the at least two separate microphones is known; identifying at least one source of the audio communication from the processing of the video image as part of a visual identification of the at least one source of the audio communication; determining, based on the identifying of the at least one source of the audio communication, an angle from the first mobile computing device to the at least one source of the audio communication; and contemporaneously displaying, on a display output of the first mobile computing device, (1) first location information associated with the visual identification of the at least one source of the audio communication overlaid on the video image and (2) second location information comprising the angle from the first mobile computing device to the at least one source of the audio communication.

Additional embodiments of such a method may function where the first location information comprises information identifying lips of a person that is the at least one source of the audio communication. Additional embodiments of such a method may function where the first location information further comprises information identifying a face of the person that is identified as the at least one source of the audio communication. Additional embodiments of such a method may function where the first location information comprises information identifying a mouth of at least one person that is identified as the at least one source of the audio communication; and where the angle from the first mobile computing device is determined from a point associated with the at least two separate microphones.

Additional embodiments of such a method may further comprise identifying a second mouth of a second speaker in the video image; determining a second angle associated with a second direction from the point associated with the at least two separate microphones to a second source of the audio communication; and processing the at least two raw electronic audio signals from the at least two separate microphones to simultaneously filter sounds received from outside the angle and the second angle and/or to emphasize sounds received from the angle and the second angle.

Additional embodiments of such a method may function where the angle is defined from the point associated with the at least two separate microphones to corners of the mouth of the at least one person that is identified as the at least one source of the audio communication. Additional embodiments of such a method may function the first location information comprises a shape drawn around the mouth of the at least one person that is identified as the at least one source of the audio communication.

Additional embodiments of such a method may further include processing the at least two raw electronic audio signals to (a) filter sounds received from outside the angle and/or (b) to emphasize sounds received from the angle. Additional embodiments of such a method may further include tracking a relative movement of the mouth in the video image over time; and adjusting the angle to match the relative movement of the mouth in the video image.

Additional embodiments of such a method may further include ending the processing of the at least two raw electronic audio signals to filter the sounds received from outside the angle and/or to emphasize the sounds received from the angle when the mouth of the person that is identified as the at least one source of the audio communication moves outside the video image.

Additional embodiments of such a method may function where the first location information and the second location information each comprise part of a user interface.

Additional embodiments of such a method may further include receiving a first user input adjusting the first location information using a first portion of the user interface associated with the first location information; and automatically adjusting the second location information and a second portion of the user interface associated with the second location information in response to the adjusting the first portion of the user interface. Additional embodiments of such a method may function where automatically adjusting the second location information comprises: changing the angle; and updating the display output.

Additional embodiments of such a method may function where adjusting the first portion of the user interface associated with the first location information comprises adjusting the shape drawn around the mouth of the person that is identified as the at least one source of the audio communication;

and where automatically adjusting second location information comprises updating the angle based on the second portion of the user interface associated with the shape drawn around the mouth.

Additional embodiments of such a method may function where the user input adjusting the second portion of the user interface associated with the second location information automatically adjusts the first portion of the user interface.

Another embodiment may be mobile computing device comprising a processor; a display output for outputting video image, wherein the display is coupled to the processor; at least two separate microphones, wherein the at least two microphones are coupled to the processor; and a memory coupled to the processor, wherein the memory comprises instructions that when executed by the processor, cause the processor to: process the video image and an audio communication associated with the video image, wherein the audio communication comprises at least two raw electronic audio signals created from the at least two separate microphones, and wherein a relative position of the at least two separate microphones is known; identify at least one source of the audio communication from the processing of the video image as part of a visual identification of the at least one source of the audio communication; determine, based on the identifying of the at least one source of the audio communication, an angle from the first mobile computing device to the at least one source of the audio communication; and contemporaneously display, on the display output (1) first location information associated with the visual identification of the at least one source of the audio communication overlaid on the video image and (2) second location information comprising the angle from the first mobile computing device to the at least one source of the audio communication.

Additional embodiments of such a device may function where the first location information comprises information identifying a person that is identified as the at least one source of the audio communication; and where the angle from the first mobile computing device is determined from a point associated with the at least two separate microphones.

Still further embodiments of such a device may function where identifying the person that is identified as the at least one source of the audio communication comprises: identifying a first person as a first source of the audio communication; identifying a second person as a second source of the audio communication: wherein the first person is associated with (1) first location information associated with a visual identification of the first person overlaid on the video image and (2) second location information comprising the angle from the mobile computing device to the first person; and wherein the second person is associated with (1) second location information associated with a visual identification of the second person overlaid on the video image and (2) second location information comprising a second angle from the mobile computing device to the second person.

One further embodiment may be a mobile computing device comprising: means for processing video image and an audio communication associated with the video image, wherein the audio communication comprises at least two raw electronic audio signals created from at least two separate microphones, and wherein a relative position of the at least two separate microphones is known; means for identifying at least one source of the audio communication from the processing of the video image as part of a visual identification of the at least one source of the audio communication; means for determining, based on the identifying of the at least one source of the audio communication, an angle from the first mobile computing device to the at least one source of the audio communication; and means for contemporaneously displaying, on a display output of the first mobile computing device, (1) first location information associated with the visual identification of the at least one source of the audio communication overlaid on the video image and (2) second location information comprising the angle from the first mobile computing device to the at least one source of the audio communication.

Additional embodiments of such a device may further comprise means for receiving a first user input adjusting the first location information using a first portion of the user interface associated with the first location information; means for receiving a second user input adjusting the second location information using a second portion of the user interface; and means for automatically adjusting the second location information when the first user input is received and for automatically adjusting the first location information when the second user input is received.

Another embodiment may be a method of visual and audio identification of a sound source comprising: capturing, by a far-side mobile device, a far-side video image and a far-side audio communication, wherein the far-side audio communication comprises at least two raw electronic audio signals created from at least two separate microphones integrated as part of the far-side mobile device, and wherein a relative position of the at least two separate microphones is known; communicating the far-side video image and the far-side audio communication from the far-side mobile device to a near-side mobile device via a network; processing the far-side video image and the far-side audio communication to identify at least one source of the far-side audio communication as part of a visual identification of the at least one source of the far-side audio communication; determining, based on the identifying of the at least one source of the far-side audio communication, at least one angle from the far-side mobile device to the at least one source of the far-side audio communication; processing the at least two raw electronic audio signals to (a) filter sounds received from outside the at least one angle from the far-side mobile device to the at least one source of the far-side audio communication and/or to (b) emphasize sounds received from the at least one angle from the far-side mobile device to the at least one source of the far-side audio communication; and creating an output comprising (1) first far-side location information associated with the visual identification of the at least one source of the far-side audio communication overlaid on the far-side video image and (2) second far-side location information comprising the at least one angle from the far-side mobile device to the at least one source of the far-side audio communication.

Additional embodiments of such a method may operate where the determining of the at least one angle from the far-side mobile device to the at least one source of the far-side audio communication is performed by the far-side mobile device, and wherein the at least one angle from the far-side mobile device to the at least one source of the far-side audio communication is communicated from the far-side mobile device to the near-side mobile device with the far-side video image and the far-side audio communication.

Additional embodiments of such a method may operate where (1) processing the at least processing the far-side video image and the far-side audio communication to identify at least one source of the far-side audio communication as part of a visual identification of the at least one source of the far-side audio communication is performed by the near-side mobile device after the near-side mobile device receives the far-side video image and the far-side audio communication.

Additional embodiments of such a method may operate where the near-side mobile device receives the relative position of the at least two separate microphones along with reception of the far-side audio communication. Additional embodiments of such a method may operate where the first far-side location information and the second far-side location information each comprise part of a user interface presented on a display output of the near-side mobile device.

Additional embodiments of such a method may further include receiving a first near-side user input adjusting the first far-side location information using a first portion of the user interface associated with the first far-side location information.

Additional embodiments of such a method may further include automatically adjusting the second far-side location information and a second portion of the user interface associated with the second far-side location information in response to the adjusting the first portion of the user interface; determining an updated at least one angle from the far-side mobile device to the at least one source of the far-side audio communication; and automatically adjusting processing the at least two raw electronic audio signals based on the updated at least one angle from the far-side mobile device to the at least one source of the far-side audio communication.

Additional embodiments of such a method may further include capturing, by the near-side mobile device, a near-side video image and a near-side audio communication, wherein the near-side audio communication comprises an additional at least two raw electronic audio signals created from an additional at least two separate microphones integrated as part of the near-side mobile device, and wherein a second relative position of the additional at least two separate microphones is known; processing the near-side video image and the near-side audio communication to identify at least one source of the near-side audio communication as part of a visual identification of the at least one source of the near-side audio communication; determining, based on the identifying of the at least one source of the near-side audio communication, the at least one angle from the near-side mobile device to the at least one source of the near-side audio communication; and creating a second output for the near-side mobile device comprising (1) first near-side location information associated with the visual identification of the at least one source of the near-side audio communication overlaid on the near-side video image and (2) second near-side location information comprising the at least one angle from the near-side mobile device to the at least one source of the near-side audio communication.

Additional embodiments of such a method may further include displaying the first near-side location information, the second near-side location information, the first far-side location information, and the second far-side location information in a display output of the near-side mobile device as part of a user interface of the near-side mobile device; wherein the at least one source of the far-side audio communication comprises a user of the far-side mobile device and wherein the at least one source of the near-side audio communication comprises a user of the near-side mobile device.

Additional embodiments of such a method may further include processing the at least two raw electronic audio signals prior to communicating the far-side audio communication from the far-side mobile device to the near-side mobile device; receiving, at the far-side mobile device, a first far-side user input adjusting the first far-side location information using a first portion of a user interface associated with the first far-side location information; and adjusting the processing of the at least two raw electronic audio signals based on the first far-side user input.

Additional embodiments will be apparent from the descriptions provided herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
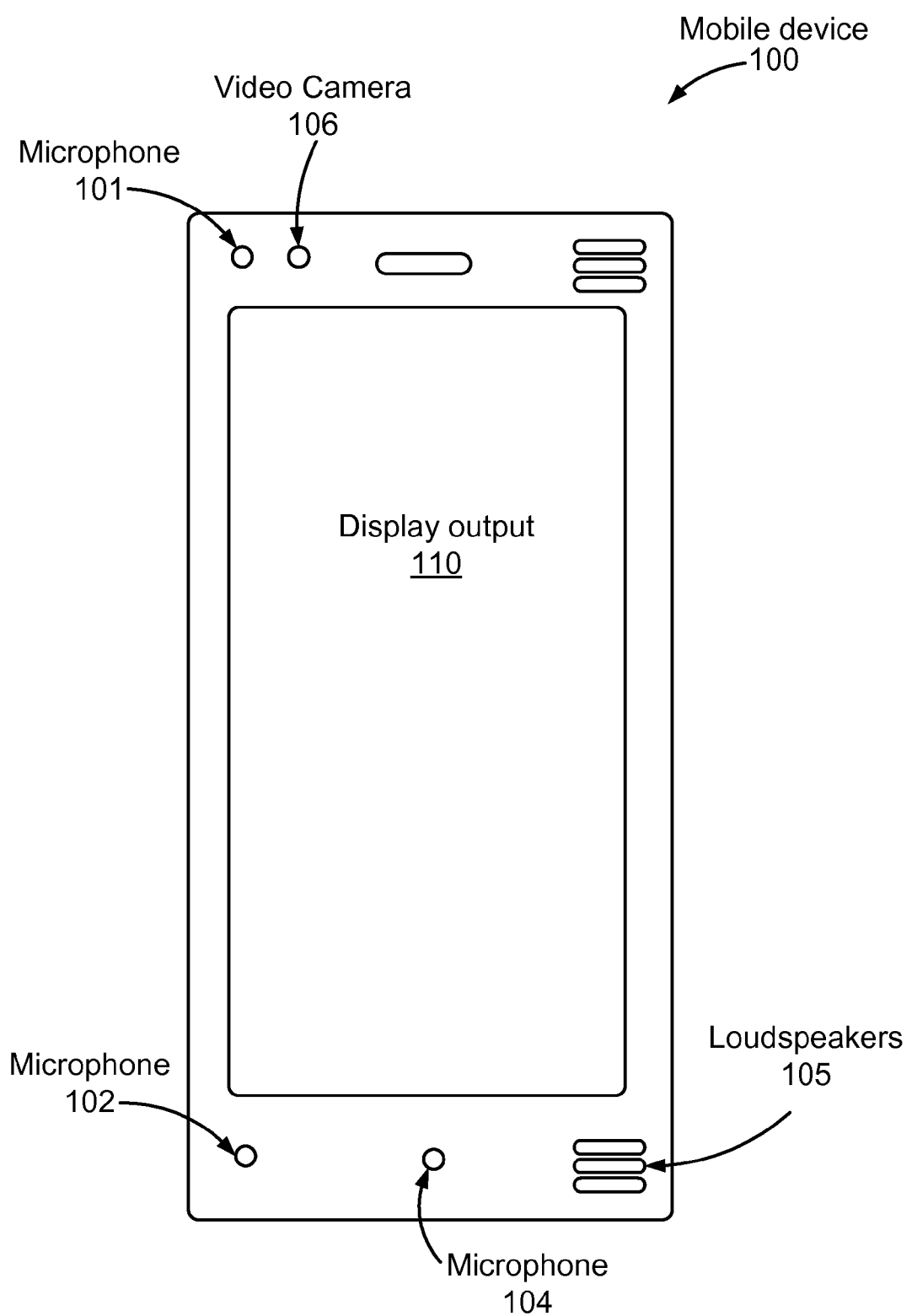
FIG. 1A illustrates aspects of a mobile computing device in accordance with one embodiment.

Embodiments described herein include systems, methods, devices, and computer readable media for electronic communication, in particular for improving sound quality systems for recognizing and focusing on at least one source of an audio communication as part of a communication including a video image and an audio communication derived from two or more microphones when a relative position between the microphones is known.

As described in more detail below, when multiple channels of audio information are created with a known relative position between microphones used to create the channels, the difference between signals on the channels may be used to identify information about the source of an audio signal. This difference may then further be used to process the signals in order to emphasize information coming from a source direction or angle, suppress information coming from outside the source angle, or both. When the source of the audio signal is visually identifiable, information from a video image may further be used to calibrate, select, or improve direction focus in the selection of an angle to emphasize. Further, a user interface may be created that shows both the visually identifiable audio source and an angle associated with the audio sector information for a direction from the device to the audio source. User adjustment of the visually identified audio source in the user interface may automatically adjust an angle associated with audio sector information. Similarly, user adjustment of the angle may automatically create a change in the visually identified audio source.

Embodiments described herein may use systems and methods for mapping an audio source location as described in U.S. patent application Ser. No. 13/833,867 entitled "SYSTEMS AND METHODS FOR MAPPING COORDINATES" which is related to and claims priority from U.S. Provisional Patent Application Ser. No. 61/713,447 filed Oct. 12, 2012, for "SYSTEMS AND METHODS FOR MAPPING COORDINATES," U.S. Provisional Patent Application Ser. No. 61/714,212 filed Oct. 15, 2012, for "SYSTEMS AND METHODS FOR MAPPING COORDINATES," U.S. Provisional Application Ser. No. 61/624,181 filed Apr. 13, 2012, for "SYSTEMS, METHODS, AND APPARATUS FOR ESTIMATING DIRECTION OF ARRIVAL," U.S. Provisional Application Ser. No. 61/642,954, filed May 4, 2012, for "SYSTEMS, METHODS, AND APPARATUS FOR ESTIMATING DIRECTION OF ARRIVAL" and U.S. Provisional Application No. 61/726,336, filed Nov. 14, 2012, for "SYSTEMS, METHODS, AND APPARATUS FOR ESTIMATING DIRECTION OF ARRIVAL" all of which are incorporated by reference for all purposes. These references describe focus for improving audio quality by emphasizing audio information from a particular direction.

Embodiments described herein further determine and improve on the selection of a direction to emphasize by using video image information to select an angle to emphasize. This selection of a direction may be modified or changed with a user interface which displays both video image information associated with the direction of a source and audio information associated with the direction of a source.

For example, in one potential embodiment, a user is making a video call from one mobile device to another mobile device. The user may hold the device such that a camera is pointed at the user's face and the user is speaking toward multiple microphones on the mobile device. As the phone call is initiated, the device may automatically identify the user's mouth, and begin emphasizing sound from certain directional sectors associated with the direction of the user's mouth. As the user tilts the phone, as the phone shakes while the user is moving, or as the user moves with respect to the phone in any way, the video information and audio information may be used to track this movement, and adjust the angle of emphasis during the video call. If the user desires to adjust the emphasis, a user interface mode may be presented to enable the user to change the tracked source of the audio communication. The user interface may display both a video interface showing the tracked source of the audio communication, and may also display an audio interface showing the direction of a tracked audio communication. The user may manipulate information in the interface to make adjustments. For example, the user may adjust the tracking to focus on the user's entire face instead of the user's mouth as part of an adjustment of a first part of the user interface. The user may also broaden the angle of focus for the audio emphasis using the second part of the interface. Any change to one part of the interface may change the audio emphasis, and may cause an automatic change to the other part of the interface. This "linking" described above may be implemented as part of any embodiment, and is detailed further below.

FIG. 1A shows an example of a multi-microphone handset mobile device 100 that includes a first microphone pair with microphone 102 and microphone 104 whose axis is in a left-right direction of a front face of the device. In certain embodiments, a front/back microphone pair may also be present from a microphone on the back of the device (not shown). Such a second microphone pair has an axis that is in a front-back direction (i.e., orthogonal to the front face). Such an arrangement may be used to determine when a user is speaking at the front face of the device (e.g., in a browse-talk mode). Another microphone pair may be along the third axis, such as a microphone pair with microphone 101 and microphone 102. The front-back pair may be used to resolve an ambiguity between front and back directions that the left-right pair typically cannot resolve on its own. In some implementations, the mobile device 100 may include one or more loudspeakers 105 a touchscreen configured with a display output 110, along with a lens with video camera 106 and/or one or more additional microphones.

In addition to a handset as shown in FIG. 1A, other examples of audio sensing devices that may be implemented to include a multi-microphone array and to perform a method as described herein include portable computing devices (e.g., laptop computers, notebook computers, netbook computers, ultra-portable computers, tablet computers, mobile Internet devices, smartbooks, smartphones, phablets, etc.), audio- or video-conferencing devices, and display screens (e.g., computer monitors, television sets).

Processing a multichannel signal from two or more microphones includes calculating, for each of a plurality of different frequency components of the multichannel signal, a difference between a phase of the frequency component in each of a first pair of channels of the multichannel signal, to obtain a plurality of phase differences. This processing also includes estimating an error, for each of a plurality of candidate directions, between the candidate direction and a vector that is based on the plurality of phase differences. This processing also includes selecting, from among the plurality of candidate directions, a candidate direction that corresponds to the minimum among the estimated errors. In such processing, each of said first pair of channels is based on a signal produced by a corresponding one of a first pair of microphones, and at least one of the different frequency components has a wavelength that is less than twice the distance between the microphones of the first pair.

It may be assumed that in the near-field and far-field regions of an emitted sound field, the wavefronts are spherical and planar, respectively. The near-field may be defined as that region of space that is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about one hundred seventy, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

A device as shown in FIG. 1A may be configured to determine the direction of arrival (DOA) of a source signal by measuring a difference (e.g., a phase difference) between the microphone channels for each frequency bin to obtain an indication of direction, and averaging the direction indications over all bins to determine whether the estimated direction is consistent over all bins. The range of frequency bins that may be available for tracking is typically constrained by the spatial aliasing frequency for the microphone pair. This upper limit may be defined as the frequency at which the wavelength of the signal is twice the distance, d, between the microphones. Such an approach may not support accurate tracking of source DOA beyond one meter and typically may support only a low DOA resolution. Moreover, dependence on a front-back pair to resolve ambiguity may be a significant constraint on the microphone placement geometry—for example, when placing the device on a surface, one of the front or back microphone may be effectively occluded. Such an approach also may use only one fixed pair for tracking.

It may be desirable to provide a generic speakerphone application such that the multi-microphone device may be placed arbitrarily (e.g., on a table for a conference call, on a car seat, etc.) and track and/or enhance the voices of individual speakers. Such an approach may be capable of dealing with an arbitrary target speaker position with respect to an arbitrary orientation of available microphones. It may also be desirable for such an approach to provide instantaneous multi-speaker tracking/separating capability. Unfortunately, the current state of the art is a single-microphone approach.

It may also be desirable to support source tracking in a far-field application, which may be used to provide solutions for tracking sources at large distances and unknown orientations with respect to the multi-microphone device. The multi-microphone device in such an application may include an array mounted on a television or set-top box, which may be used to support telephony. Examples include the array of a Kinect®[1] device and arrays from Skype®[2] and Samsung Electronics Co., Ltd. (Suwon, Republic of Korea). In addition to the large source-to-device distance, such applications typically also suffer from a bad signal-to-interference-noise ratio (SINR) and room reverberation.

It is a challenge to provide a method for estimating a three-dimensional direction of arrival (DOA) for each frame of an audio signal for concurrent multiple sound events that is sufficiently robust under background noise and reverberation. Robustness can be obtained by maximizing the number of reliable frequency bins. It may be desirable for such a method to be suitable for arbitrarily shaped microphone array geometry, such that specific constraints on microphone geometry may be avoided. A pair-wise one-dimensional approach as described herein can be appropriately incorporated into any geometry.

The systems and methods disclosed herein may be implemented for such a generic speakerphone application or far-field application. Such an approach may be implemented to operate without a microphone placement constraint. Such an approach may also be implemented to track sources using available frequency bins up to Nyquist frequency and down to a lower frequency (e.g., by supporting use of a microphone pair having a larger inter-microphone distance). Rather than being limited to a single pair for tracking, such an approach may be implemented to select a best pair among all available pairs. Such an approach may be used to support source tracking even in a far-field scenario, up to a distance of three to five meters or more, and to provide a much higher DOA resolution. Other potential features include obtaining an exact 2D representation of an active source. For best results, it may be desirable that each source is a sparse broadband audio source, and that each frequency bin is mostly dominated by no more than one source.

Figure 1B:
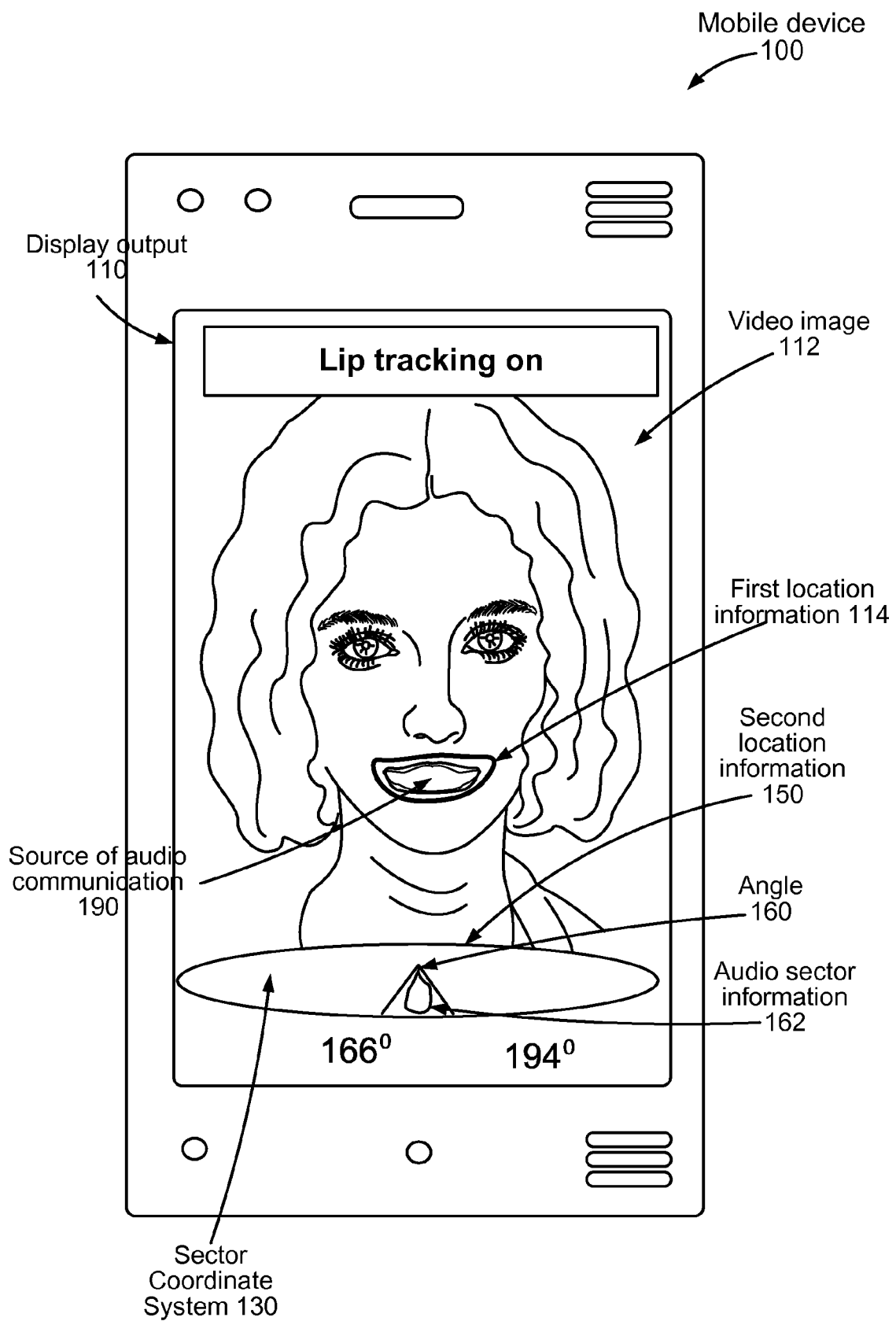
FIG. 1B illustrates aspects of the mobile computing device of FIG. 1A and an associated interface in accordance with one embodiment.

FIG. 1B shows the mobile device 100 of FIG. 1A with a display and location information presented in the display. As shown in FIG. 1B, the display output 110 is showing video image 112. The video image may be of a local user that is using mobile device 100, or may be a video image of a remote user that is talking with a user of mobile device 100. Different implementations under these two different circumstances will be described in more detail below.

FIG. 1B further shows first location information 114 identifying a source of an audio communication 190. Source of the audio communication 190 is shown in video image 112 as a mouth of a speaker. First location information 114 includes output information on display output 110 which identifies the source of the audio communication 190. In other embodiments, the source of the audio communication may be considered the entire body of a speaker, a head of a speaker, a physical device such as a stereo speaker, or any other such noise source. Additionally, in various embodiments, multiple sources of audio communication may be identified at a single time. Location information 114 is shown as an outline of the speaker's mouth. In various embodiments, location information may be a rectangle, a square, a semi-transparent volume, a change from the normal color of the audio source, or any other such indicator which may generally identify a sound source in a video image such as video image 112.

FIG. 1B further shows second location information 150 having angle 160 and audio sector information 162 set in sector coordinate system 130. Second location information 150 comprises directional information from a point around at least two microphones that receive an audio communication from the source of audio communication 190, which is labeled as audio sector information 162. Angle 160 is an angle from that point to some portion or cross-section of the first location information identifying a source of audio communication 190. In one embodiment, sector coordinate system 130 may be a polar coordinate system with the point at the center of the coordinate system. Angle 160 may thus be thought of as directional information relating the position between an audio source and at least two speakers. This information may be used to suppress sound communications or noise that occurs from a direction outside of angle 160. Additional details on this directionality are described with respect to FIGS. 2A and 2B.

Figure 1C:
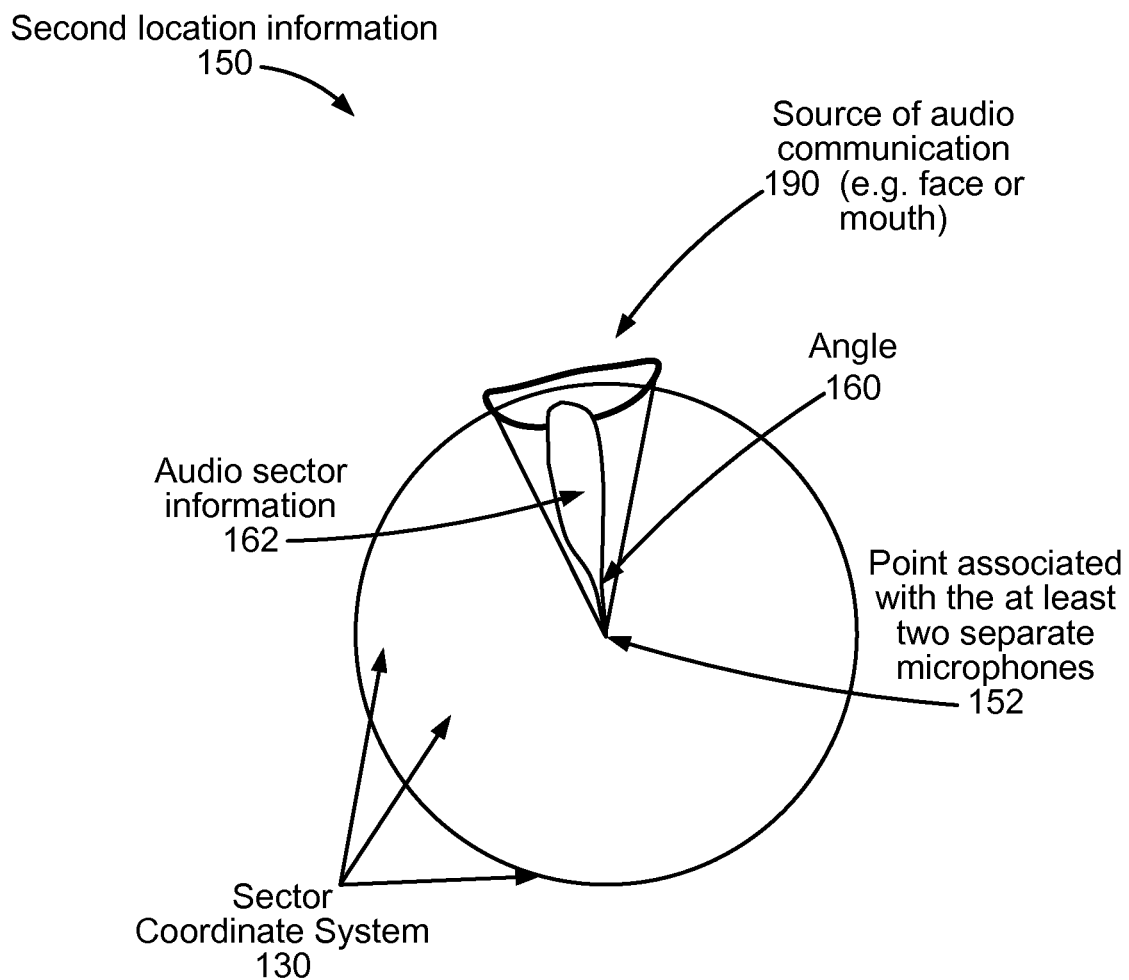
FIG. 1C illustrates aspects of the interface of FIG. 1B in accordance with one embodiment.

FIG. 1C describes additional information about second location information 150 as shown in FIG. 1B. As described above, second location information 150 provides directional information related to a device and noise detected by the device shown as audio sector information 162 within a sector coordinate system 130. Audio sector information 162 provides a sound magnitude in polar directions from a point. Point associated with at least two separate microphones 152 represents a center toward which audio communication is sent. The point 152 may be the location of one microphone, with one or more other microphones with known positions around that point. Alternatively, the point 152 may be a space between or around the at least two microphones. As described herein, phase differences between the arrival of sound at each microphone may be used to estimate the direction that the sound is approaching from. This information may be plotted relative to the point 152. Rather than simply relying on incoming sound information, though, video information may be used in conjunction with sound direction to identify an audio source. In certain embodiments, source of audio communication 190 may be identified in a video image and used to estimate an initial position. A distance to the audio source may be estimated using information such as an average distance between user's eyes, or an electromagnetic range finder integrated with a mobile device. Known characteristics of a camera may also be used in such estimates. This information may be used to determine an initial angle 160 and may be verified by subsequently received audio communications. This information may be integrated into a single display output as part of an interface on top of video image 112.

Audio sector information 162 may be determined, in certain embodiments, as described below with respect to FIGS. 2A and 2B. For a signal received by a pair of microphones directly from a point source in a particular direction of arrival (DOA) relative to the axis of the microphone pair, the phase delay differs for each frequency component and also depends on the spacing between the microphones. The observed value of the phase delay at a particular frequency component (or "bin") may be calculated as the inverse tangent (also called the arctangent) of the ratio of the imaginary term of the complex FFT coefficient to the real term of the complex FFT coefficient.

Figure 2B:
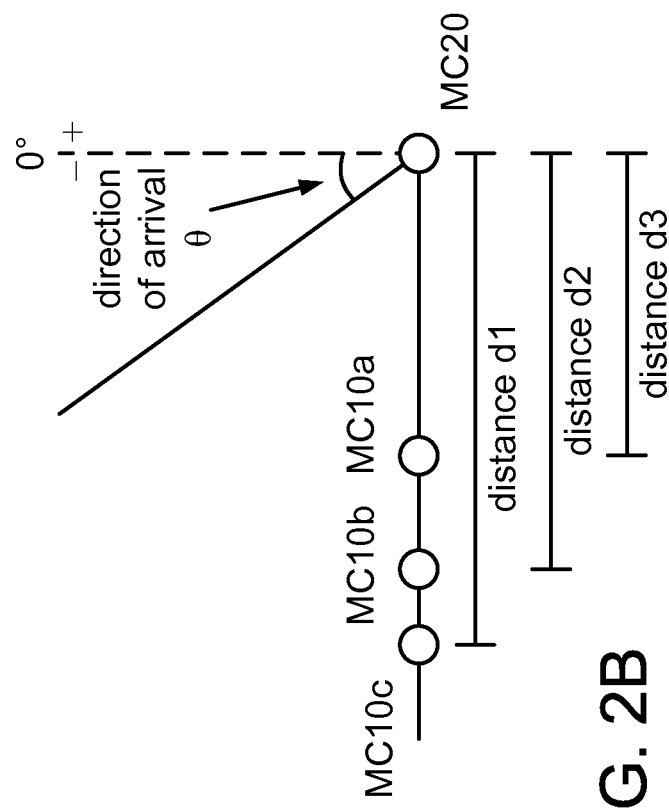
FIG. 2B shows multiple microphone pairs in a linear array.
Figure 2A:
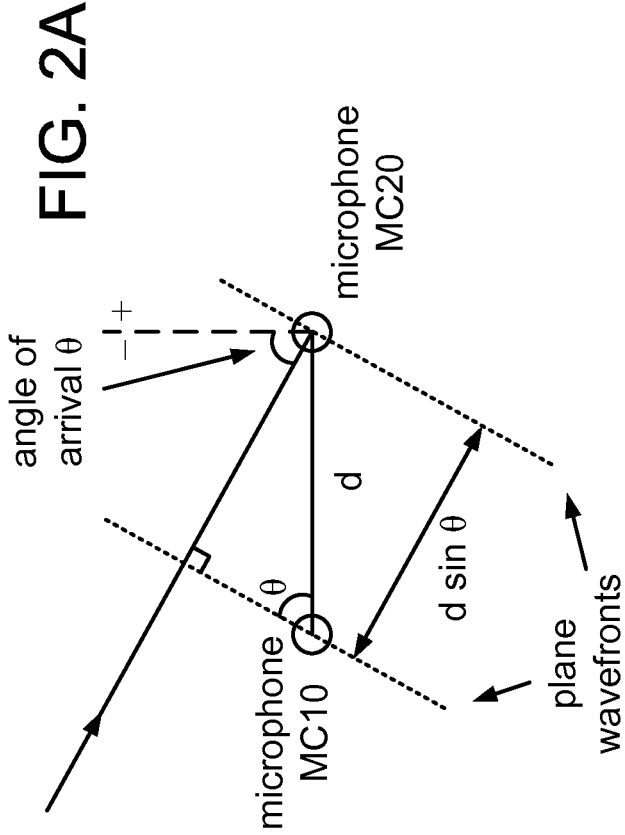
FIG. 2A shows a far-field model of plane wave propagation relative to a microphone pair.

As shown in FIG. 2A, the phase delay value for a source 200 for at least one microphone pair including microphone MC10 and MC20 at a particular frequency f may be related to source DOA under a far-field (i.e., plane-wave) assumption as, where d denotes the distance between the microphones MC10, MC20 (in meters), θ denotes the angle of arrival (in radians) relative to a direction that is orthogonal to the array axis, f denotes frequency (in Hz), and c denotes the speed of sound (in m/s). As will be described below, the DOA estimation principles described herein may be extended to multiple microphone pairs in a linear array (e.g., as shown in FIG. 2B). For the ideal case of a single point source with no reverberation, the ratio of phase delay to frequency will have the same value over all frequencies. The DOA, relative to a microphone pair is a one-dimensional measurement that defines the surface of a cone in space (e.g., such that the axis of the cone is the axis of the array). When used in conjunction with video information and/or multiple microphone pairs, an angle may be estimated for a direction of arrival. This information may also be used to filter sound directionally.

Such an approach is typically limited in practice by the spatial aliasing frequency for the microphone pair, which may be defined as the frequency at which the wavelength of the signal is twice the distance d between the microphones. Spatial aliasing causes phase wrapping, which puts an upper limit on the range of frequencies that may be used to provide reliable phase delay measurements for a particular microphone pair.

FIG. 2B shows a measurement model in which a one-dimensional DOA estimate indicates an angle (in the 180-degree range of +90 degrees to −90 degrees) relative to a plane that is orthogonal to the axis of the array. This is for an implementation with microphones MC10a, MC10b, MC10c, having distances d3, d2, and d1, respectively, to another microphone MC20. The phase differences for these multiple microphone pairs may be used to resolve ambiguity or improve accuracy in directional sound information such as audio sector information 162. Although a limited number of implementations are described herein, it will be recognized that such implementations are not limiting and in other contexts, corresponding implementations with reference to other contexts (e.g., in which the DOA estimate indicates an angle of 0 to 180 degrees relative to the axis in the direction of microphone MC10 or, alternatively, in the direction away from microphone MC10) are expressly contemplated and hereby disclosed.

The desired angular span may be arbitrary within the 180-degree range. For example, the DOA estimates may be limited to selected sectors of interest within that range. Thus, for example, in a phone with only a forward facing camera, the sound suppression system may automatically suppress all information with an ambiguous direction, and may further suppress sound outside an angle in detected direction, such that all sound coming from a back side of a camera is always suppressed when a sound quality system is active.

The desired angular resolution may also be arbitrary (e.g. uniformly distributed over the range, or non-uniformly distributed). Additionally or alternatively, the desired frequency span may be arbitrary (e.g., limited to a voice range) and/or the desired frequency resolution may be arbitrary (e.g. linear, logarithmic, mel-scale, Bark-scale, etc.).

In various embodiments, then the video and audio information captured by a mobile device may be integrated with a user interface to enable user control of an audio quality improvement system, as well as providing an automatic initial state for the audio quality improvement system.

Figure 3:
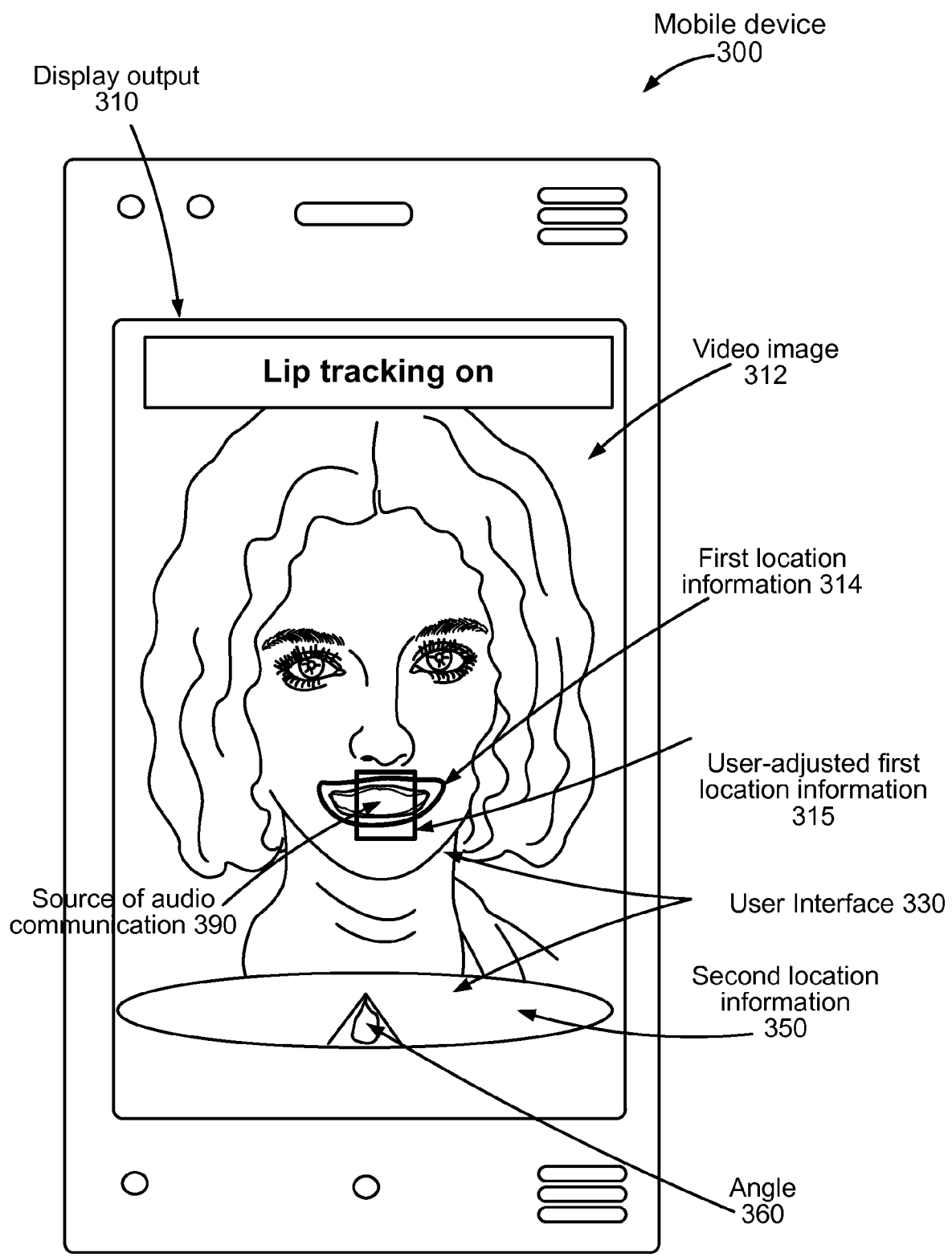
FIG. 3 illustrates aspects of the mobile computing device of and an associated interface in accordance with one embodiment.
Figure 5:
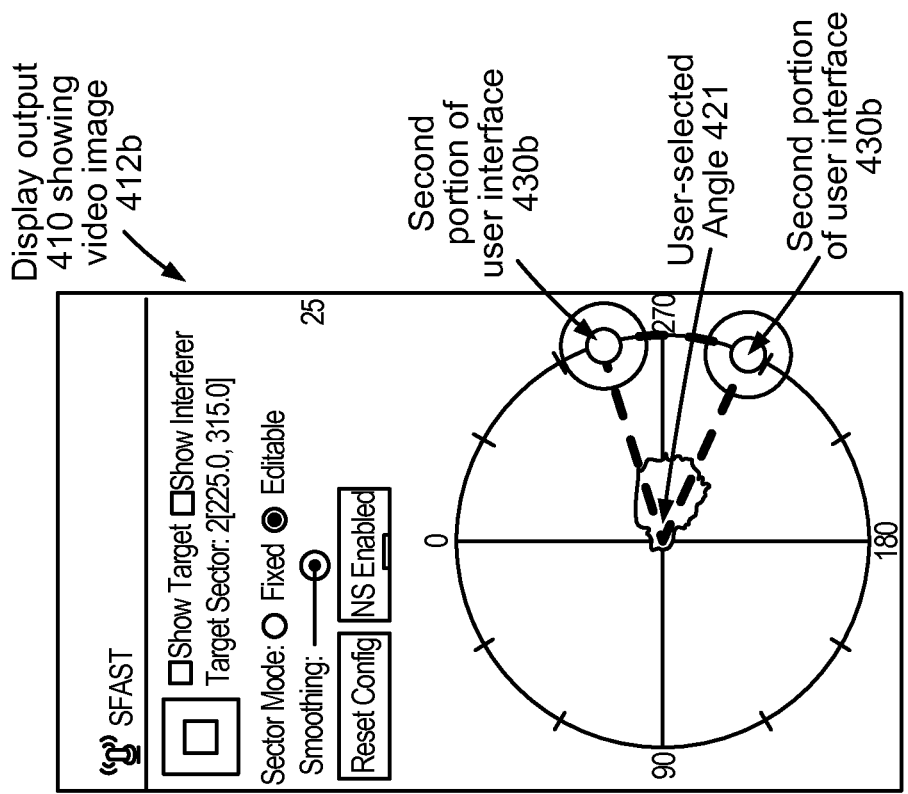
FIG. 5 illustrates aspects of an interface of and audio communication source focusing in accordance with one potential embodiment.
Figure 4:
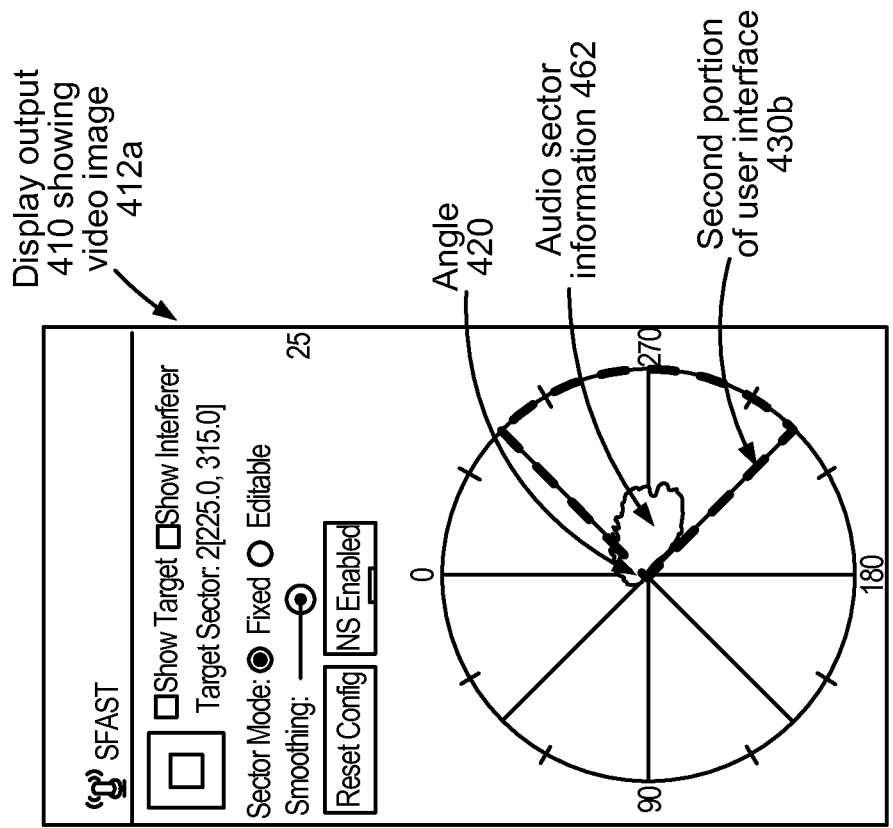
FIG. 4 illustrates aspects of an interface of and audio communication source focusing in accordance with one potential embodiment.

FIGS. 3, 4, and 5 now describe how this information may be used as part of an interface to control an audio quality improvement system. FIG. 3 describes a mobile device 300 similar to mobile device 100 of FIG. 1. In FIG. 3, a display output 310 shows video image 312 as well as user interface 330. The user interface 330 is created with first location information 314 and second location information 350. The user interface 330 thus comprises selectable portions of information displayed on video image 312 which may be adjusted by a user, and which may adjust the function of the audio processing. The portion of the user interface 330 associated with the video image 312 may be referred to herein as a first portion of the user interface. The portion of the user interface 330 related to the polar directional coordinates based on second location information 350 and showing the directional source of audio communication 390 and angle 360 may be referred to as a second portion of user interface 330. When a user manipulates the user interface to adjust first location 314, second location information 350 may be automatically updated by an automatic change in angle 360. Similarly, if a user manipulates angle 360 (as shown in more detail with respect to FIGS. 4 and 5) the first location information 314 may be automatically changed. In certain embodiments, this may be referred to as "linking." This may function in certain embodiments such that enlarging or shrinking a bounding box on a video image may automatically result in a corresponding enlarging or shrinking of an angle associated with audio sector information. This may work in reverse is certain embodiments, where the "linking" also enables a user input to adjust the angle or positioning of displayed audio sector information, with a corresponding automatic change in a displayed bounding box on a video image.

In one potential embodiment, first location information 314 may be automatically identified lips of a user as a source of audio communication 390. This first location information 314 may, however, be displayed as a user interface when, for example, display output 310 is a touch screen. A user may then interact with a first portion of user interface 330 to adjust the identified source of the audio communication. This may be done to increase a focus and remove noise, or may be done to decrease focus to capture more signal. As shown in FIG. 3, user-adjusted first location information 315 changes the identified source of audio communication 390 to a focused square around the center of a speaker's mouth. Such a change will automatically narrow angle 360 to match the change in the location information from first location information 314 to user-adjusted first location information 315. As the mobile device 300 or source of audio communication 390 moves, the system will then track the updated user-adjusted first location information 315. Additional user interactions may change the identified source of audio communication 390 in any fashion or shape selected by the user. The geometric relationship between the microphones and the user-adjusted first location information 315 will automatically update angle 360, and thereby automatically update audio enhancement related to angle 360.

While FIG. 3 shows a change in first location automatically impacting an angle associated with audio suppression or enhancement, the inverse relationship may also occur, where user manipulation of an angle automatically adjusts first location information associated with the video image.

FIG. 4 shows display output 410 with video image 412a. The video image 412a includes audio sector information 462, along with an angle 420 and a second portion of user interface 430b. This may be considered similar to the second location information 350 of FIG. 3, but shown with directional coordinates in a circle instead of the compressed oval of second location information 350. Angle 420 shows a direction from microphones to a source of a user communication, just as in the figures described above. The angle 420, however, may be shown by an indicator that is part of a second portion of user interface 430b. As shown by FIG. 5 with video image 412b, the second user interface portion 430b may be manipulated to change angle 420 into user-selected angle 421. Thus, when the user interacts with the second user interface 430b, the angle 420 is changed and an associated identified source in a related video image 412b may be automatically adjusted. For example, if the user narrows the angle by changing from angle 420 to narrower user-selected angle 421, an automatic compression may be done, for example, changing first location information 314 to narrower user-adjusted first location information 315. Scaling of two-dimensional aspects of the source of audio communication 390 represented by location information may be done automatically in response to system or user-selected settings. For example, a shape outline may be automatically simplified to a simpler geometric shape, or a direct scaling may be done with continuous tracking of the initial shape used to update the user-adjusted shape as a source is tracked during movement of the source relative to a camera of a mobile device.

The embodiments described by the figures each show one angle and one set of audio sector information. In certain implementations however, the system may include multiple angles of emphasis at the same time. This may provide a benefit when more than one speaker is talking at the same time. In such an embodiment, a video image may display multiple bounding boxes around the face or mouth of each speaker to be emphasized. Each bounding box will be associated with an angle of emphasis and audio sector information, such as angle 160 and audio sector information 162. This will create multiple areas of emphasis separated by multiple areas of de-emphasis. As speakers or noise sources are tracked, these multiple areas may merge and separate depending on the movement of the noise sources relative to the speakers. The number of emphasis angles may be limited by the functionality of the noise suppression systems or noise emphasis systems that are part of the device. Just as with tracking a single noise source, each angle will be associated with corresponding location information from a visual image. In certain embodiments, an input adjusting location information or a bounding box may only "link" with the corresponding angle, and any other angles or bounding boxes will not be adjusted. In additional embodiments, a system may include an input to adjust all bounding boxes and angles. Such an input may enable all areas or locations to be increased or decreased by a certain amount. This may be in addition to inputs that only adjust single linked pairs of bounding box location information and angles of emphasis.

Figure 6:
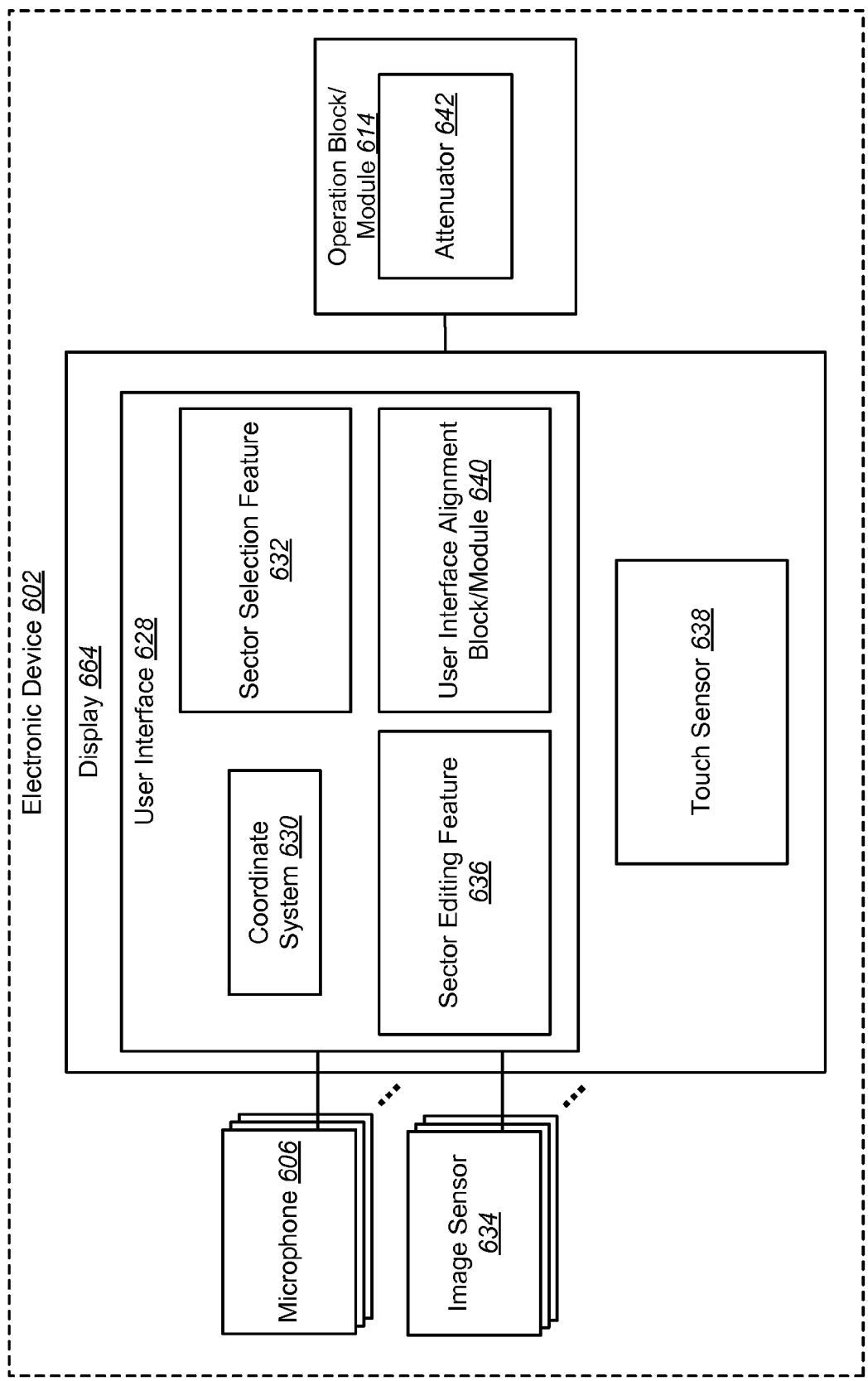
FIG. 6 illustrates one example of a mobile device for use with one embodiment.

FIG. 6 is a block diagram illustrating one configuration of a user interface 628 in which systems and methods for displaying a user interface 628 on an electronic device 602 may be implemented. In some implementations, the user interface 628 may be included on a display 664 of an electronic device 602 that may be examples of corresponding elements described in connection with FIG. 2. The electronic device 602 may include a user interface 628, at least one microphone 606, an operation block/module 614, a display 664 and/or a sector selection feature 632 that may be examples of corresponding elements described in one or more of FIGS. 5 and 6.

In some implementations, the user interface 628 may present a sector editing feature 636, and/or a user interface alignment block/module 640. The sector editing feature 636 may allow for editing of at least one sector. For example, the sector editing feature 636 may allow editing of at least one selected sector of the physical coordinate system 630. The sector editing feature 636 may be implemented by at least one element included in the display 664. For example, the user interface 628 may include at least one touch point that allows a user to adjust the size of a selected sector. In some implementations, the sector editing feature 636 may operate based on touch input. For example, the sector editing feature 636 may allow editing of a selected sector based on a single touch input. In some implementations, the sector editing feature 636 may allow for at least one of adjusting the size of a sector, adjusting the shape of a sector, adjusting the boundaries of a sector and/or zooming in on the sector. In some implementations, the sector editing feature 636 may allow editing of multiple sectors at the same time. In this example, the sector editing feature 636 may allow editing of the multiple sectors based on multiple touch inputs.

As described above, in certain implementations, at least one of the sector selection features 632 and the sector editing feature 636 may operate based on a single touch input or multiple touch inputs. For example, the sector selection feature 632 may be based on one or more swipe inputs. For instance, the one or more swipe inputs may indicate a circular region. In some configurations, the one or more swipe inputs may be a single swipe. The sector selection feature 632 may be based on single- or multi-touch input. Additionally or alternatively, the electronic device 602 may adjust a sector based on a single- or multi-touch input.

In these examples, the display 664 may include a touch sensor 638 that may receive touch input (e.g., a tap, a swipe or circular motion) that selects a sector. The touch sensor 638 may also receive touch input that edits a sector, for example, by moving touch points displayed on the display 664. In some configurations, the touch sensor 638 may be integrated with the display 664. In other configurations, the touch sensor 638 may be implemented separately in the electronic device 602 or may be coupled to the electronic device 602.

The user interface alignment block/module 640 may align all or part of the user interface 628 with a reference plane. In some implementations, the reference plane may be horizontal (e.g., parallel to ground or a floor). For example, the user interface alignment block/module 640 may align part of the user interface 628 that displays the coordinate system 630. In some implementations, the user interface alignment block/module 640 may align all or part of the user interface 628 in real time.

In some configurations, the electronic device 602 may include at least one image sensor 634. For example, several image sensors 634 may be included within an electronic device 602 (in addition to or alternatively from multiple microphones 606). The at least one image sensor 634 may collect data relating to the electronic device 602 (e.g., image data). For example, a camera (e.g., an image sensor 634) may generate an image. In some implementations, the at least one image sensor 634 may provide image data to the display 664.

The electronic device 602 may pass audio signals (e.g., a target audio signal) included within at least one sector. For example, the electronic device 602 may pass audio signals to an operation block/module 614. The operation block/module 614 may pass one or more audio signals indicated within the at least one sector. In some implementations, the operation block/module 614 may include an attenuator 642 that attenuates an audio signal. For example, the operation block/module 614 (e.g., attenuator 642) may attenuate (e.g., block, reduce and/or reject) audio signals not included within the at least one selected sector (e.g., interfering audio signal(s)). In some cases, the audio signals may include a voice signal. For instance, the sector selection feature 632 may allow attenuation of undesirable audio signals aside from a user voice signal.

In some configurations, the electronic device (e.g., the display 664 and/or operation block/module 614) may indicate image data from the image sensor(s) 634. In one configuration, the electronic device 602 (e.g., operation block/module 614) may pass image data (and filter other image data, for instance) from the at least one image sensor 634 based on the at least one sector. In other words, at least one of the techniques described herein regarding the user interface 628 may be applied to image data alternatively from or in addition to audio signals.

Figure 7:
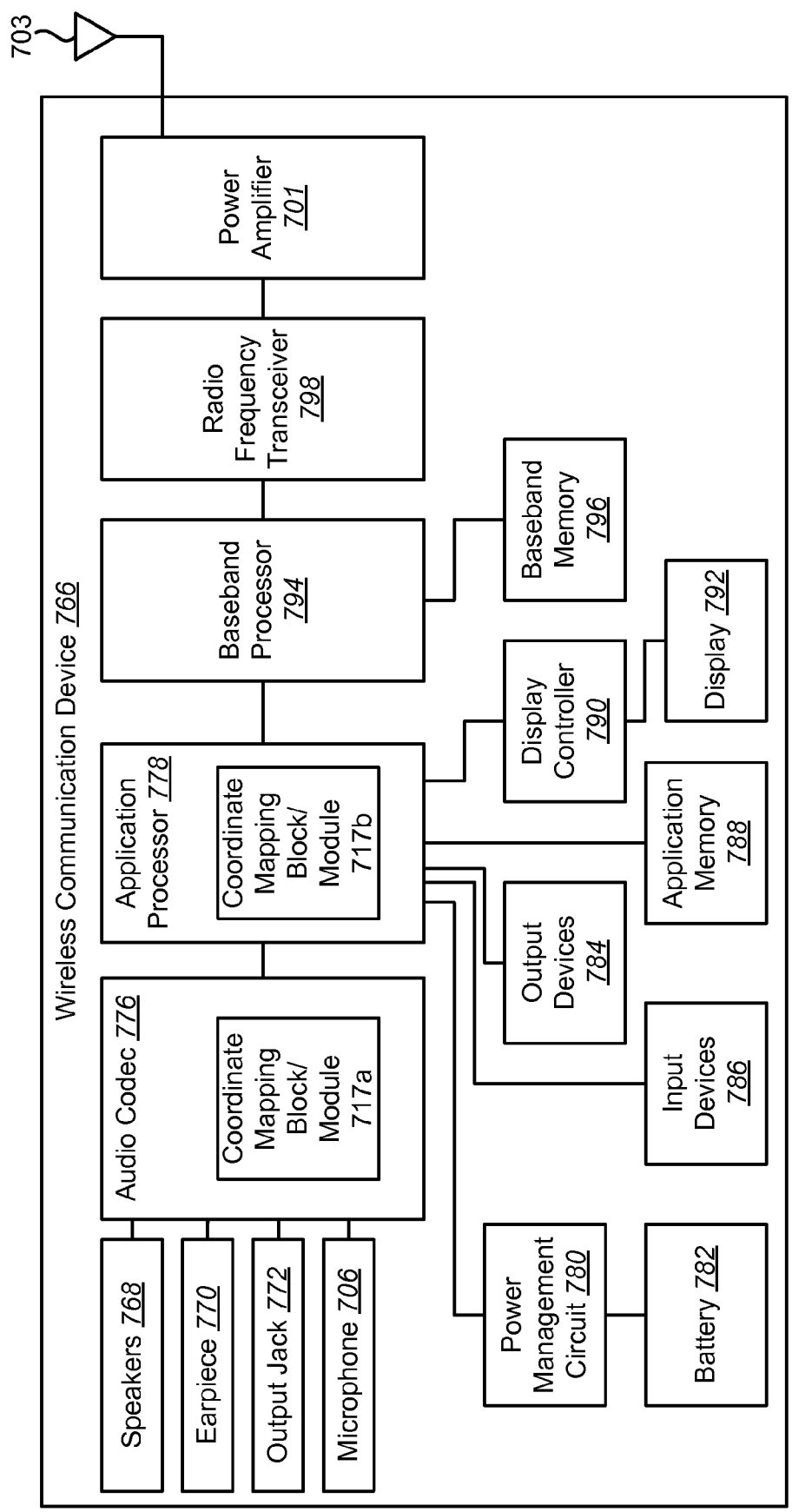
FIG. 7 illustrates one example of a mobile device for use with one embodiment.

FIG. 7 is a block diagram illustrating one configuration of a wireless communication device 766 which may be similar to mobile device 100 and mobile device 300. Wireless communication 766 may describe a device in which systems and methods for mapping a source location may be implemented. The wireless communication device 766 illustrated in FIG. 7 may be an example of at least one of the electronic devices described herein. The wireless communication device 766 may include an application processor 778. The application processor 778 generally processes instructions (e.g., runs programs) to perform functions on the wireless communication device 766. The application processor 778 may be coupled to an audio coder/decoder (codec) 776.

The audio codec 776 may be an electronic device (e.g., integrated circuit) used for coding and/or decoding audio signals. The audio codec 776 may be coupled to at least one speaker 768, an earpiece 770, an output jack 772 and/or at least one microphone 706. The speakers 768 may include one or more electro-acoustic transducers that convert electrical or electronic signals into acoustic signals. For example, the speakers 768 may be used to play music or output a speakerphone conversation, etc. The earpiece 770 may be another speaker or electro-acoustic transducer that can be used to output acoustic signals (e.g., speech signals) to a user. For example, the earpiece 770 may be used such that only a user may reliably hear the acoustic signal. The output jack 772 may be used for coupling other devices to the wireless communication device 766 for outputting audio, such as headphones. The speakers 768, earpiece 770 and/or output jack 772 may generally be used for outputting an audio signal from the audio codec 776. The at least one microphone 706 may be an acousto-electric transducer that converts an acoustic signal (such as a user's voice) into electrical or electronic signals that are provided to the audio codec 776.

A coordinate mapping block/module 717a may be optionally implemented as part of the audio codec 776. For example, the coordinate mapping block/module 717a may be implemented in accordance with one or more of the functions and/or structures described herein. For example, the coordinate mapping block/module 717a may be implemented in accordance with one or more of the functions and/or structures described in connection with FIGS. 1-6.

Additionally or alternatively, a coordinate mapping block/module 717b may be implemented in the application processor 778. For example, the coordinate mapping block/module 717b may be implemented in accordance with one or more of the functions and/or structures described herein. For example, the coordinate mapping block/module 717b may be implemented in accordance with one or more of the functions and/or structures described in connection with FIGS. 1-6.

The application processor 778 may also be coupled to a power management circuit 780. One example of a power management circuit 780 is a power management integrated circuit (PMIC), which may be used to manage the electrical power consumption of the wireless communication device 766. The power management circuit 780 may be coupled to a battery 782. The battery 782 may generally provide electrical power to the wireless communication device 766. For example, the battery 782 and/or the power management circuit 780 may be coupled to at least one of the elements included in the wireless communication device 766.

The application processor 778 may be coupled to at least one input device 786 for receiving input. Examples of input devices 786 include infrared sensors, image sensors, accelerometers, touch sensors, keypads, etc. The input devices 786 may allow user interaction with the wireless communication device 766. The application processor 778 may also be coupled to one or more output devices 784. Examples of output devices 784 include printers, projectors, screens, haptic devices, etc. The output devices 784 may allow the wireless communication device 766 to produce output that may be experienced by a user.

The application processor 778 may be coupled to application memory 788. The application memory 788 may be any electronic device that is capable of storing electronic information. Examples of application memory 788 include double data rate synchronous dynamic random access memory (DDRAM), synchronous dynamic random access memory (SDRAM), flash memory, etc. The application memory 788 may provide storage for the application processor 778. For instance, the application memory 788 may store data and/or instructions for the functioning of programs that are run on the application processor 778.

The application processor 778 may be coupled to a display controller 790, which in turn may be coupled to a display 792. The display controller 790 may be a hardware block that is used to generate images on the display 792. For example, the display controller 790 may translate instructions and/or data from the application processor 778 into images that can be presented on the display 792. Examples of the display 792 include liquid crystal display (LCD) panels, light-emitting diode (LED) panels, cathode ray tube (CRT) displays, plasma displays, etc.

The application processor 778 may be coupled to a baseband processor 794. The baseband processor 794 generally processes communication signals. For example, the baseband processor 794 may demodulate and/or decode received signals. Additionally or alternatively, the baseband processor 794 may encode and/or modulate signals in preparation for transmission.

The baseband processor 794 may be coupled to baseband memory 796. The baseband memory 796 may be any electronic device capable of storing electronic information, such as SDRAM, DDRAM, flash memory, etc. The baseband processor 794 may read information (e.g., instructions and/or data) from and/or write information to the baseband memory 796. Additionally or alternatively, the baseband processor 794 may use instructions and/or data stored in the baseband memory 796 to perform communication operations.

The baseband processor 794 may be coupled to a radio frequency (RF) transceiver 798. The RF transceiver 798 may be coupled to a power amplifier 701 and one or more antennas 703. The RF transceiver 798 may transmit and/or receive radio frequency signals. For example, the RF transceiver 798 may transmit an RF signal using a power amplifier 701 and at least one antenna 703. The RF transceiver 798 may also receive RF signals using the one or more antennas 703.

Figure 8:
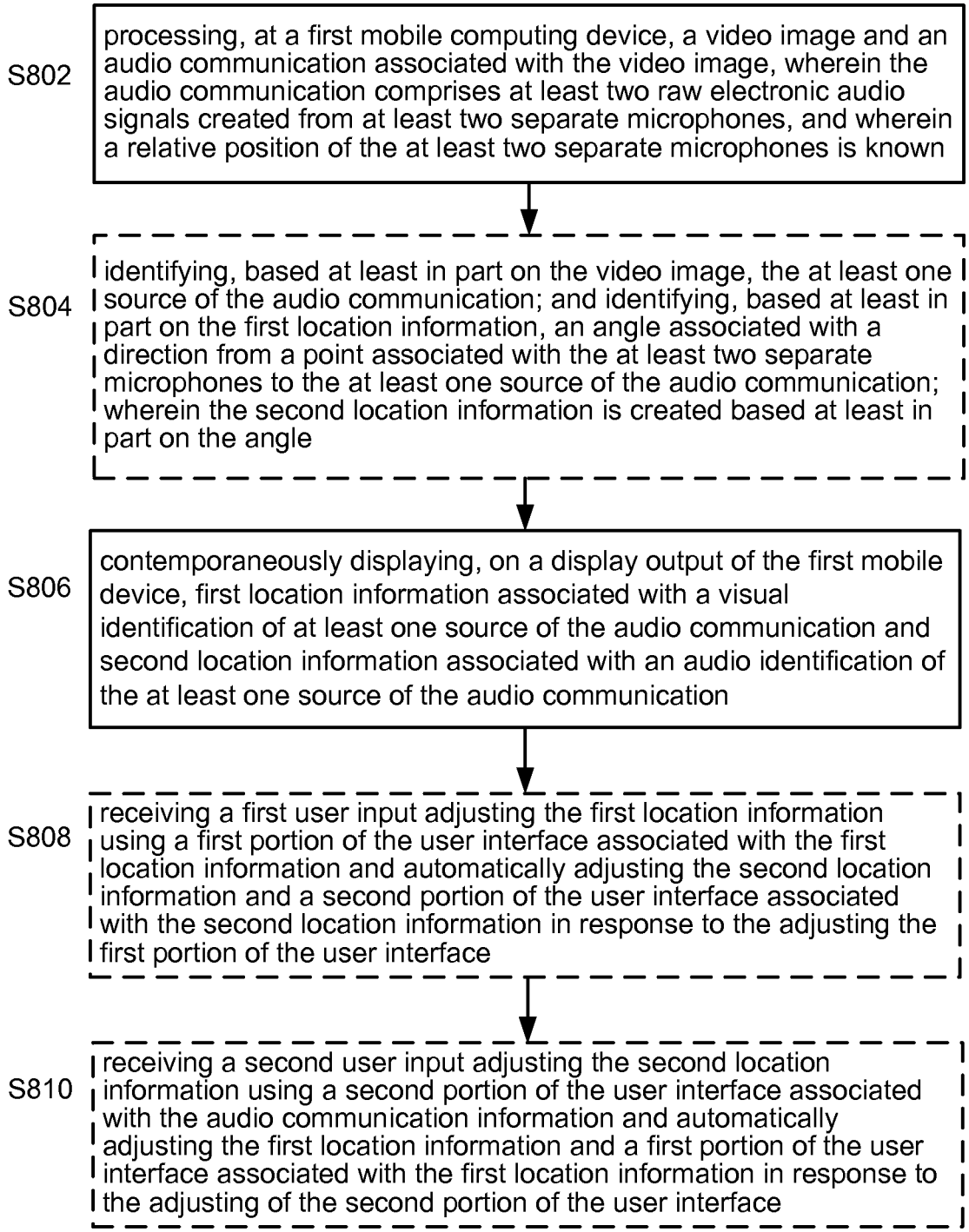
FIG. 8 describes a method for improving audio performance using source focusing in accordance with one embodiment.

FIG. 8 now describes a method for using the devices and systems above to implement audio improvement. S802 involves processing, at a first mobile computing device, a video image and an audio communication associated with the video image, wherein the audio communication comprises at least two raw electronic audio signals created from at least two separate microphones, and wherein a relative position of the at least two separate microphones is known. S804 optionally involves identifying, based at least in part on the video image, the at least one source of the audio communication; and identifying, based at least in part on the first location information, an angle associated with a direction from a point associated with the at least two separate microphones to the at least one source of the audio communication; wherein the second location information is created based at least in part on the angle. S806 involves contemporaneously displaying, on a display output of the first mobile device, first location information associated with a visual identification of at least one source of the audio communication and second location information associated with an audio identification of the at least one source of the audio communication. This enables one embodiment which is a video based initialization of an audio sector determination system.

S808 then optionally involves receiving a first user input adjusting the first location information using a first portion of the user interface associated with the first location information and automatically adjusting the second location information and a second portion of the user interface associated with the second location information in response to the adjusting the first portion of the user interface. This describes a user input to adjust a part of the user interface from video information as described above with respect to FIG. 3.

S810 then optionally involves receiving a second user input adjusting the second location information using a second portion of the user interface associated with the audio communication information and automatically adjusting the first location information and a first portion of the user interface associated with the first location information in response to the adjusting of the second portion of the user interface. Similar to S808, this describes the related function where a user adjustment of an angle associated with detected audio sectors automatically adjusts a source of an audio communication identified in association with a video image as detailed with respect to FIGS. 4 and 5.

Figure 9:
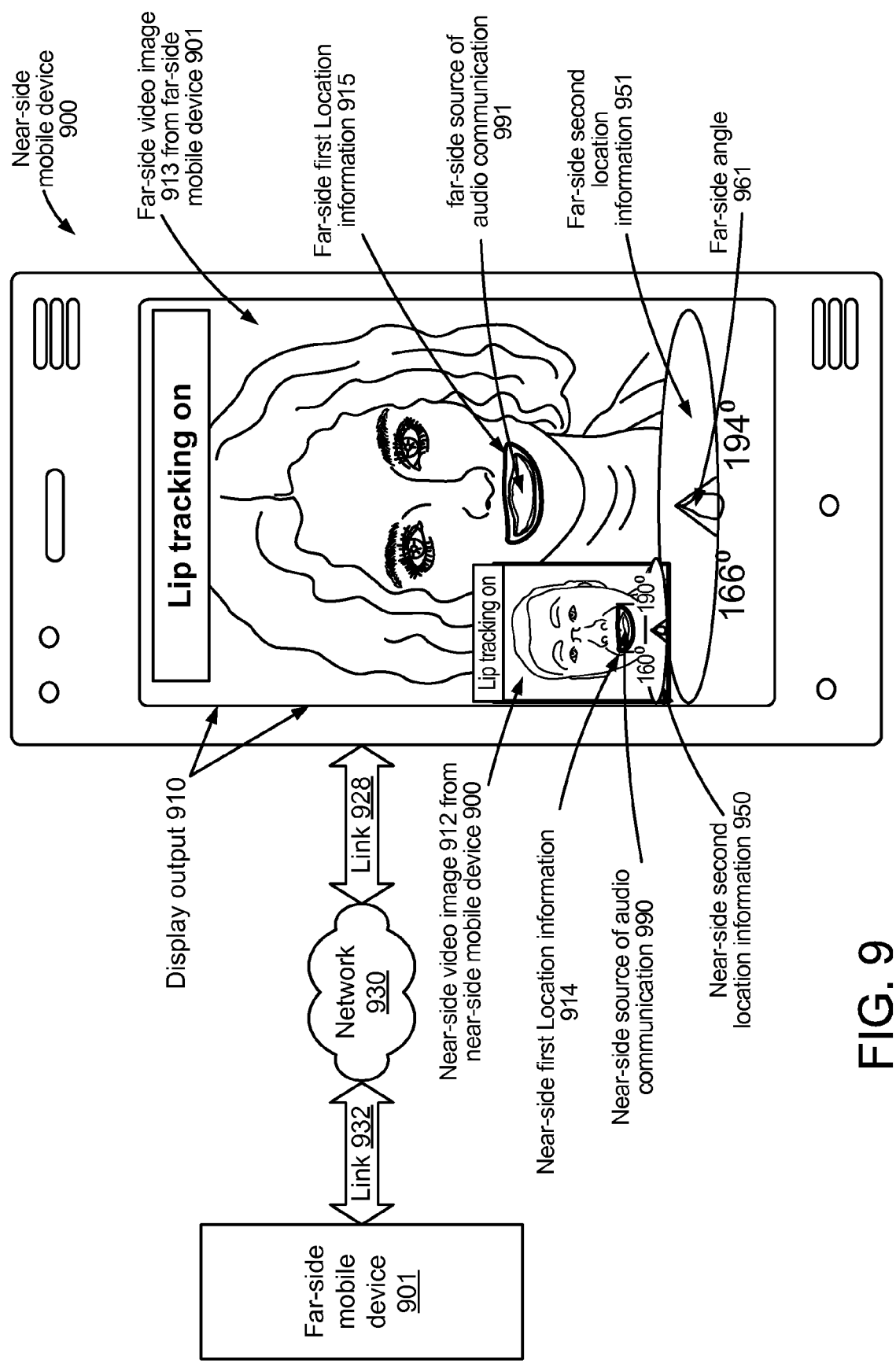
FIG. 9 illustrates a two-device system with a "near-side" device and a "far-side" device in accordance with one embodiment.

FIG. 9 describes communication in a multi-device system. FIG. 9 includes near-side mobile device 900 and far-side mobile device 901 which may communicate via network 930 using link 932 and link 928. For the purposes of description, the system is described from the perspective of near-side mobile device 900 which may implement the systems described herein. In various embodiments, far-side mobile device 901 may also implement the systems described herein. If multiple devices in a communication system implement these direction based tracking and audio improvement systems, each device will essentially function as a near-side device from the perspective of that device's user.

As shown in FIG. 9, near-side mobile device 900 is displaying far-side video image 913 from far-side mobile device 901 in a large area of display output 910, and is displaying near-side video image 912 in a small picture in picture portion of display output 910. In various embodiments, the large and small portions may be reversed or displayed one at a time as in FIGS. 1B and 3. The far-side video image 913 from far-side mobile device 901 is shown with far-side first location information 915 identifying a far-side source of audio communication 991. Far-side second location information 951 includes far-side angle 961 as well as audio sector information.

Similar near-side information is shown in the small portion of display output 910, including near-side video image 912 from near-side mobile device 900. This includes near-side first location information 914 identifying a near-side source of audio communication 990, and near-side second location information 950. In various embodiments, different user interface portions may be included in both the large and small portions of display output 910 depending on size, design selections, and/or user preference selections. This enables audio sector information and associated video image information to be used at one device to improve both transmitted audio and received audio.

Figure 10:
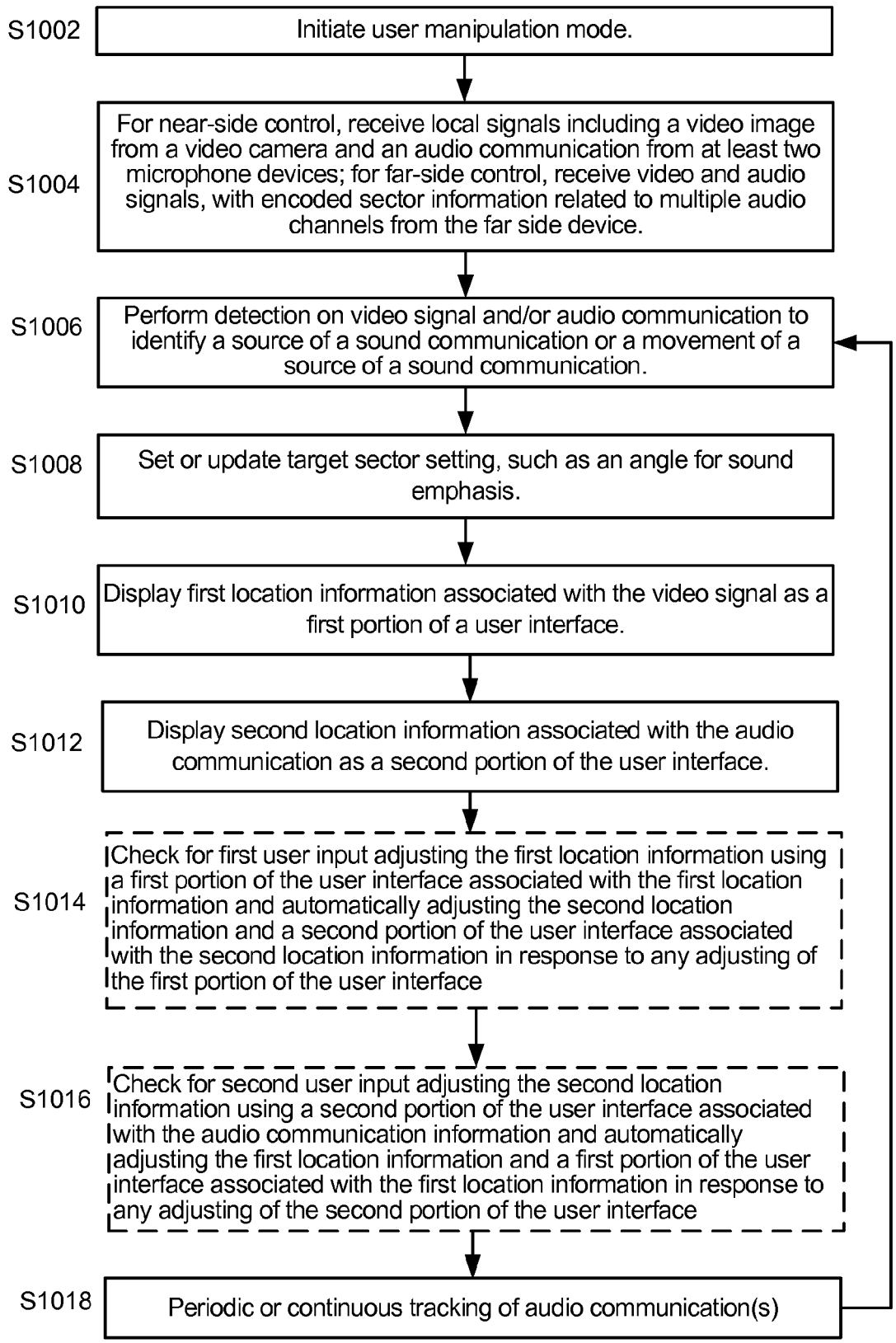
FIG. 10 describes a method for improving audio performance using source focusing in accordance with an embodiment which may include a near-side device and/or a far-side device.

FIG. 10 further details a method associated with enablement of audio sector information and associated video image information which may be used at one device to improve both transmitted audio and received audio. In S1002, a mobile device enters a user manipulation mode. This may be automatically selected based on device triggers, or may be a user selection as part of a communication. In S1004, a system may function with near-side control, to receive local signals including a video image from a video camera and an audio communication from at least two microphone devices. This may be equivalent to near-side video image 912, where the control is for a local user of the user's device. The system may further function with far-side control, where a device may receive video and audio signals with encoded sector information related to multiple audio channels from the far-side device. This may be equivalent to far-side video image 913 where far-side mobile device 901 provides audio improvement control to near-side mobile device 900, as is further described in FIG. 11.

In S1006, a device may perform detection on video signal and/or audio communication to identify a source of a sound communication or a movement of a source of a sound communication. For the near-side local control, this is performed on data from sensors in the local device. For far-side control providing near-side control of information from a far-side device, this detection is performed on data from the far-side device being received at the near-side device via a network. During initialization, this detection involves initial acquisition of an audio source and initial audio sector information collection. S1008 then involves a system functioning to set or update target sector setting, such as an angle for sound emphasis. As the system functions over time, this involves updating audio source tracking and audio sector information over time as a device and/or audio source move relative to each other.

S1010 then involves display of first location information associated with the video signal as a first portion of a user interface, and S1012 involves display second location information associated with the audio communication as a second portion of the user interface. In S1014 the device may then optionally check for first user input adjusting the first location information using a first portion of the user interface associated with the first location information and automatically adjusting the second location information and a second portion of the user interface associated with the second location information in response to any adjusting of the first portion of the user interface. In S1016, the device may further optionally check for second user input adjusting the second location information using a second portion of the user interface associated with the audio communication information and automatically adjusting the first location information and a first portion of the user interface associated with the first location information in response to any adjusting of the second portion of the user interface.

In S1018, the device may perform periodic or continuous tracking of audio communication over time until a system is terminated. This involves the repetition of S1006 through S1016. During an initial operation, the system is acquiring video image recognition of an audio source and an initial sector setting for the audio communication. During subsequent repetitions, previously acquired information may be used, with updates made to first and second location information as a device and/or audio source move relative to each other.

Figure 11:
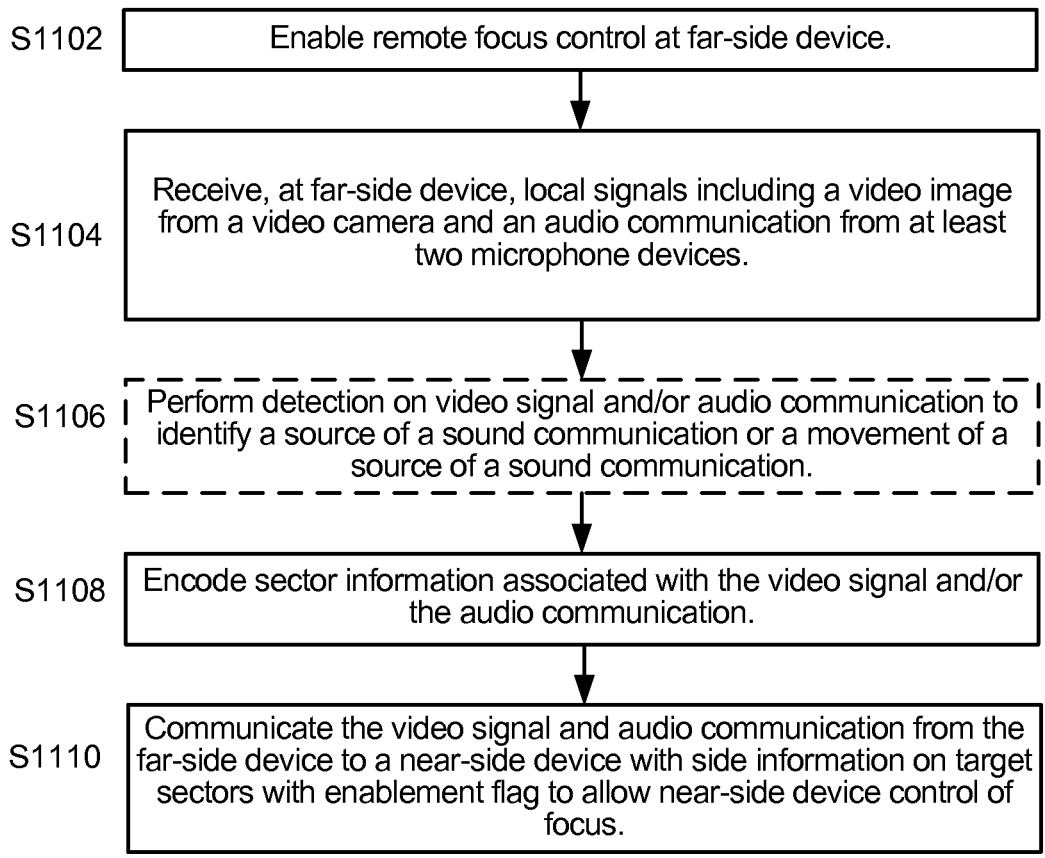
FIG. 11 describes a method for managing information in a far-side device to enable remote focus control of a communication on the far-side device in accordance with one embodiment.

FIG. 11 then describes creation of far-side data for use in far-side control by a near-side device as described in the method of FIG. 10. In S1102, remote sector focus control is enabled at a far-side device. This may be a user selection or an automatic system setting, which is used to pass additional information to another device to enable that device to improve audio received from the far-side device. In S1104, the far-side device may receive local signals from sensors on the far-side device including a video image from a video camera and an audio communication from at least two microphone devices.

In S1106, the far-side device may optionally perform some initial processing, and may perform detection on video signal and/or audio communication to identify a source of a sound communication or a movement of a source of a sound communication. If this is done on the far-side device, it may be skipped when information is received at the controlling near-side device. In S1108, a system may encode sector information associated with the video signal and/or the audio communication. In S1110, the far-side device may communicate the video signal and audio communication from the far-side device to a near-side device with side information on target sectors with enablement flag to allow near-side device control of focus. In certain embodiments, this communication from S1110 may then be received at S1104 as part of the far-side control.

Figure 12:
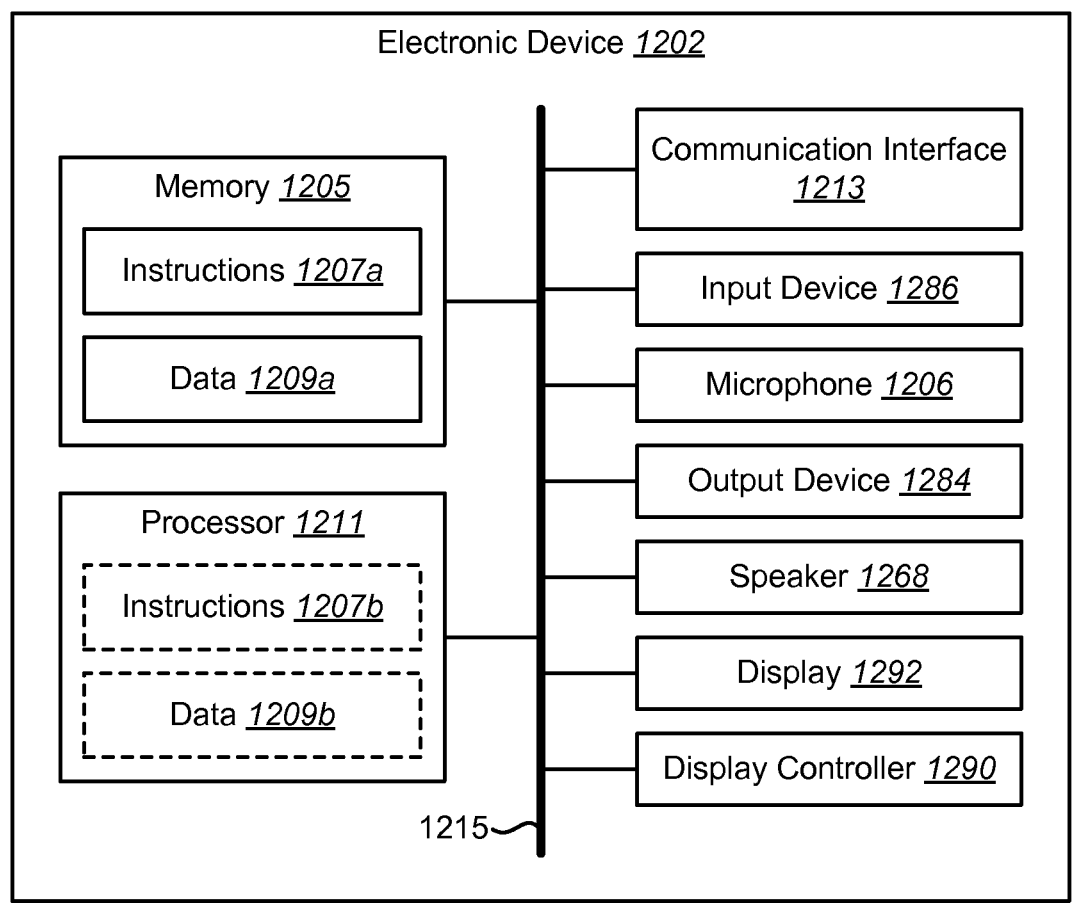
FIG. 12 is one implementation of a computing device which may be used in accordance with certain embodiments.

FIG. 12 illustrates various components that may be utilized in an electronic device 1202. The illustrated components may be located within the same physical structure or in separate housings or structures. The electronic device 1202 described in connection with FIG. 12 may be implemented in accordance with at least one of the electronic devices and the wireless communication device described herein. The electronic device 1202 includes a processor 1211. The processor 1211 may be a general purpose single- or multi-chip microprocessor (e.g., an ARM), a special purpose microprocessor (e.g., a digital signal processor (DSP)), a microcontroller, a programmable gate array, etc. The processor 1211 may be referred to as a central processing unit (CPU). Although just a single processor 1211 is shown in the electronic device 1202 of FIG. 12, in an alternative configuration, a combination of processors (e.g., an ARM and DSP) could be used.

The electronic device 1202 also includes memory 1205 in electronic communication with the processor 1211. That is, the processor 1211 can read information from and/or write information to the memory 1205. The memory 1205 may be any electronic component capable of storing electronic information. The memory 1205 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1209a and instructions 1207a may be stored in the memory 1205. The instructions 1207a may include at least one program, routine, sub-routine, function, procedure, etc. The instructions 1207a may include a single computer-readable statement or many computer-readable statements. The instructions 1207a may be executable by the processor 1211 to implement at least one of the methods described above. Executing the instructions 1207a may involve the use of the data 1209a that is stored in the memory 1205. FIG. 12 shows some instructions 1207b and data 1209b being loaded into the processor 1211 (which may come from instructions 1207a and data 1209a).

The electronic device 1202 may also include at least one communication interface 1213 for communicating with other electronic devices. The communication interface 1213 may be based on wired communication technology, wireless communication technology, or both. Examples of different types of communication interfaces 1213 include a serial port, a parallel port, a Universal Serial Bus (USB), an Ethernet adapter, an IEEE 1394 bus interface, a small computer system interface (SCSI) bus interface, an infrared (IR) communication port, a Bluetooth®[3] wireless communication adapter, and so forth.

The electronic device 1202 may also include at least one input device 1286 and at least one output device 1284. Examples of different kinds of input devices 1286 include a keyboard, mouse, microphone, remote control device, button, joystick, trackball, touchpad, lightpen, etc. For instance, the electronic device 1202 may include at least one microphone 1206 for capturing acoustic signals. In one configuration, a microphone 1206 may be a transducer that converts acoustic signals (e.g., voice, speech) into electrical or electronic signals. Examples of different kinds of output devices 1284 include a speaker, printer, etc. For instance, the electronic device 1202 may include at least one speaker 1268. In one configuration, a speaker 1268 may be a transducer that converts electrical or electronic signals into acoustic signals. One specific type of output device 1284 that may be typically included in an electronic device 1202 is a display 1292. Displays 1292 used with configurations disclosed herein may utilize any suitable image projection technology, such as a cathode ray tube (CRT), liquid crystal display (LCD), light-emitting diode (LED), gas plasma, electroluminescence, or the like. A display controller 1290 may also be provided for converting data stored in the memory 1205 into text, graphics, and/or moving images (as appropriate) shown on the display 1292.

The various components of the electronic device 1202 may be coupled together by at least one bus, which may include a power bus, a control signal bus, a status signal bus, a data bus, etc. For simplicity, the various buses are illustrated in FIG. 12 as a bus system 1215. It should be noted that FIG. 12 illustrates only one possible configuration of an electronic device 1202. Various other architectures and components may be utilized.

In various embodiments as described herein, computing devices may be networked in order to communicate information. For example, mobile devices 100 and 300 may be networked to receive information as described above. Further, network 930 may be more complex, involving many different devices. Additionally, each of these elements may engage in networked communications with other devices such as web servers, databases, or computers which provide access to information to improved audio performance as described herein.

Figure 13:
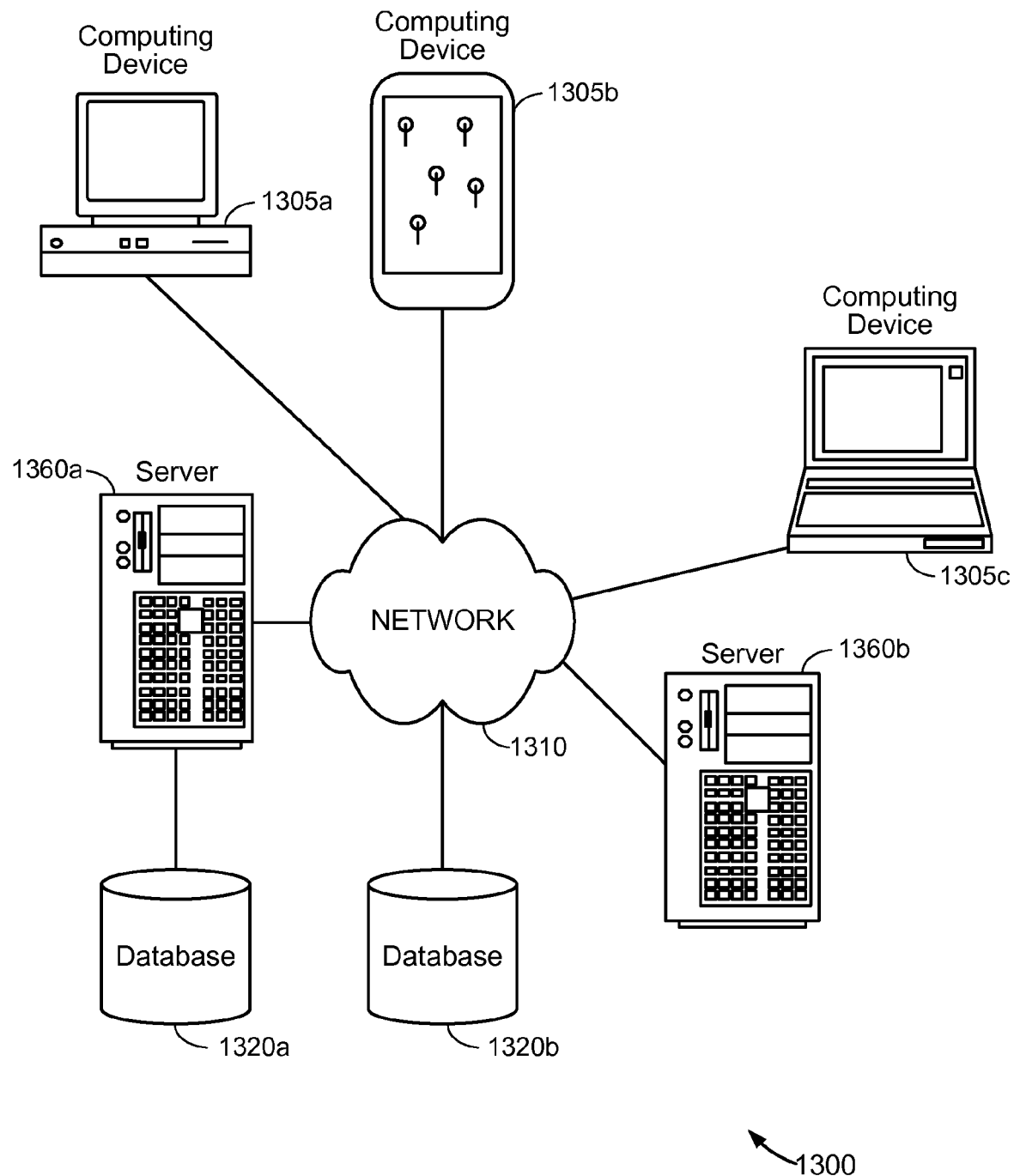
FIG. 13 is one implementation of a networked computer system according to certain embodiments.

FIG. 13 illustrates a schematic diagram of a system 1300 of networked computing devices that can be used in accordance with various embodiments to enable systems such as system 1300 or other systems that may implement map merging. In various embodiments, elements of system 1300 may function to collect anchor information, to process map information with pairs of anchor information, to deform map information for multi-level locations, and to provide the deformed map information to devices for use by a user.

The system 1300 can include one or more user computing devices 1305. The user computing devices 1305 can be general purpose personal computers (including, merely by way of example, personal computers and/or laptop computers running any appropriate flavor of Microsoft® Windows®[1] and/or Mac OS®[4] operating systems) and/or workstation computers running any of a variety of commercially-available UNIX®[5] or UNIX-like operating systems. These user computing devices 1305 can also have any of a variety of applications, including one or more applications configured to perform methods of the invention, as well as one or more office applications, database client and/or server applications, and web browser applications. Alternatively, the user computing devices 1305 can be any other electronic device, such as a thin-client computer, Internet-enabled mobile telephone, and/or personal digital assistant (PDA), capable of communicating via a network (e.g., the network 1310 described below) and/or displaying and navigating web pages or other types of electronic documents. Although the exemplary system 1300 is shown with three user computing devices 1305a-c, any number of user computing devices can be supported.

Certain embodiments of the invention operate in a networked environment, which can include a network 1310. The network 1310 can be any type of network familiar to those skilled in the art that can support data communications using any of a variety of commercially-available protocols, including, without limitation, TCP/IP, SNA, IPX, AppleTalk®[4], and the like. Merely by way of example, the network 1310 can be a local area network ("LAN"), including, without limitation, an Ethernet network; a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 1302.11 suite of protocols, the Bluetooth protocol known in the art, and/or any other wireless protocol; and/or any combination of these and/or other networks. Network 1310 may include access points for enabling access to network 1310 by various computing devices.

Embodiments of the invention can include one or more servers 1360. Each of the servers 1360 may be configured with an operating system, including, without limitation, any of those discussed above, as well as any commercially (or freely) available server operating systems. Each of the servers 1360 may also be running one or more applications, which can be configured to provide services to one or more user computing devices 1305 and/or other servers 1360. For example, in one potential embodiment, server 1360a may run a first map application that provides a first map to mobile device 300 and server 1360b may run a second application that provides a second map to mobile device 300. Mobile device 300 may then create anchor information with user input and deform the maps locally to match the anchor information for the different maps showing different levels of a location, or mobile device 300 may communicate the map information with the anchor information back to a server 1360 for processing.

Merely by way of example, one of the servers 1360 may be a web server, which can be used, merely by way of example, to process requests for web pages or other electronic documents from user computing devices 1305. The web server can also run a variety of server applications, including HTTP servers, FTP servers, CGI servers, database servers, Java®[6] servers, and the like. In some embodiments of the invention, the web server may be configured to serve web pages that can be operated within a web browser on one or more of the user computing devices 1305 to perform methods of the invention. Such servers may be associated with particular IP addresses, or may be associated with modules having a particular URL, and may thus store secure navigation modules which may interact with a mobile device such as mobile device 300 to provide secure indications of geographic points as part of location services provided to mobile device 300.

In accordance with further embodiments, one or more servers 1360 can function as a file server and/or can include one or more of the files (e.g., application code, data files, etc.) necessary to implement methods of various embodiments incorporated by an application running on a user computing device 1305 and/or another server 1360. Alternatively, as those skilled in the art will appreciate, a file server can include all necessary files, allowing such an application to be invoked remotely by a user computing device 1305 and/or server 1360. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1320. In one embodiment, a database 1320 may store anchor information that has been crowdsourced from many different mobile devices. When new information is received, analysis may be performed to determine if the anchor information in database 1320 necessitates a map deformation to align anchor information. The location of the database(s) 1320 is discretionary: merely by way of example, a database 1320a might reside on a storage medium local to (and/or resident in) a server 1360a (and/or a user computing device 1305). Alternatively, a database 1320b can be remote from any or all of the user computing devices 1305 or server computers 1360, so long as the database 1320b can be in communication (e.g., via the network 1310) with one or more of these. In a particular set of embodiments, a database 1320 can reside in a storage-area network ("SAN") familiar to those skilled in the art. (Likewise, any necessary files for performing the functions attributed to the user computing devices 1305 or servers 1360 can be stored locally on the respective computer and/or remotely, as appropriate.) In one set of embodiments, the database 1320 can be a relational database, such as an Oracle®[6] database, that is adapted to store, update, and retrieve data in response to SQL-formatted commands. The database might be controlled and/or maintained by a database server, as described above, for example. Such databases may store information relevant to levels of security, determining which users may access certain levels of security, determining which map details may be included in certain maps of a security level, or any other such details which may be used as part of location assistance or location access data. Location data which may be sensitive, such as indications of points associated with a particular mobile device, may have associated security while crowd sourced data, which includes indications of pluralities of points which cannot be associated with a particular device, may have lower security levels.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Some Figures illustrating examples of functionality and/or of the user interface as described herein are given hereafter. In some configurations, the functionality and/or user interface may be referred to in connection with the phrase "Sound Focus and Source Tracking," "SoFAST" or "SFAST."

In the above description, reference numbers have sometimes been used in connection with various terms. Where a term is used in connection with a reference number, this may be meant to refer to a specific element that is shown in at least one of the Figures. Where a term is used without a reference number, this may be meant to refer generally to the term without limitation to any particular Figure.

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, at least one microprocessor in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to at least one programs, routines, subroutines, functions, procedures, etc. "Instructions" and "code" may comprise a single computer-readable statement or many computer-readable statements.

It should be noted that at least one of the features, functions, procedures, components, elements, structures, etc., described in connection with any one of the configurations described herein may be combined with at least one of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, time division multiple access (TDMA), frequency division multiple access (FDMA), and/or time division synchronous code division multiple access (TDSCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

Examples of codecs that may be used with, or adapted for use with, transmitters and/or receivers of communications devices as described herein include the Enhanced Variable Rate Codec, as described in the Third Generation Partnership Project 2 (3GPP2) document C.S0014-C, v1.0, titled "Enhanced Variable Rate Codec, Speech Service Options 3, 68, and 70 for Wideband Spread Spectrum Digital Systems," February 2007 (available online at www.3gpp.org); the Selectable Mode Vocoder speech codec, as described in the 3GPP2 document C.S0030-0, v3.0, titled "Selectable Mode Vocoder (SMV) Service Option for Wideband Spread Spectrum Communication Systems," January 2004 (available online at www.3gpp.org); the Adaptive Multi Rate (AMR)

speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004). Such a codec may be used, for example, to recover the reproduced audio signal from a received wireless communications signal.

The presentation of the described configurations is provided to enable any person skilled in the art to make or use the methods and other structures disclosed herein. The flowcharts, block diagrams and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, intellectual property (IP) cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of a method as disclosed herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. The term "computer-program product" refers to a computing device or processor in combination with code or instructions (e.g., a "program") that may be executed, processed or computed by the computing device or processor.

It is noted that the various methods disclosed herein may be performed by an array of logic elements such as a processor, and that the various elements of an apparatus as described herein may be implemented as modules designed to execute on such an array. As used herein, the term "module" or "submodule" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, non-volatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments. Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™[7], where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices that incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

It is to be understood that the claims are not limited to the precise configuration and components illustrated above. Various modifications, changes and variations may be made in the arrangement, operation and details of the systems, methods, and apparatus described herein without departing from the scope of the claims.

[1] "Kinect", "Microsoft" and "Windows" are either registered trademarks or trademarks of Microsoft Corporation in the United States and/or other countries.

[2] The "Skype" name, associated trademarks and logos are trademarks of Skype or related entities. This application is not affiliated, sponsored, authorized or otherwise associated by/with the Skype group of companies.

[3] The "Bluetooth" word mark and logos are registered trademarks owned by Bluetooth SIG, Inc. Other trademarks and trade names are those of their respective owners.

[4] "Mac OS" and "AppleTalk" are registered trademarks of Apple, Inc., registered in the U.S. and other countries.

[5] "UNIX" is a registered trademark of The Open Group.

[6] "Java" and "Oracle" are registered trademarks of Oracle and/or its affiliates. Other names may be trademarks of their respective owners.

[7] "Blu-ray Disc" is a trademark owned by Blu-ray Disc Association (BDA).

What is claimed is:

1. A method comprising:
   processing, at a first mobile computing device, a video image and an audio communication associated with the video image, wherein the audio communication comprises at least two raw electronic audio signals created from at least two separate microphones, and wherein a relative position of the at least two separate microphones is known;
   identifying at least one source of the audio communication from the processing of the video image as part of a visual identification of at least one source of the audio communication;
   determining, based on the identifying of the at least one source of the audio communication, an angle from the first mobile computing device to the at least one source of the audio communication; and
   contemporaneously displaying, on a display output of the first mobile computing device, (1) first location information associated with the visual identification of the at least one source of the audio communication overlaid on the video image and (2) second location information comprising the angle from the first mobile computing device to the at least one source of the audio communication.

2. The method of claim 1 wherein the first location information comprises information identifying lips of a person that is the at least one source of the audio communication.

3. The method of claim 1 wherein the video image and the audio communication associated with the video image are received at the first mobile computing device via a network from at least one far-side mobile device that is different from the first mobile computing device,
   wherein the at least one far-side mobile device comprises at least one of the two separate microphones.

4. The method of claim 1 wherein the first location information comprises information identifying a mouth of at least one person that is identified as the at least one source of the audio communication; and
   wherein the angle from the first mobile computing device is determined from a point associated with the at least two separate microphones.

5. The method of claim 4 further comprising:
   identifying a second mouth of a second speaker in the video image;
   determining a second angle associated with a second direction from the point associated with the at least two separate microphones to a second source of the audio communication; and
   processing the at least two raw electronic audio signals from the at least two separate microphones to simultaneously filter sounds received from outside the angle and the second angle and/or to emphasize sounds received from the angle and the second angle.

6. The method of claim 4 wherein the angle is defined from the point associated with the at least two separate microphones to corners of the mouth of the at least one person that is identified as the at least one source of the audio communication.

7. The method of claim 6 wherein the first location information comprises a shape drawn around the mouth of the at least one person that is identified as the at least one source of the audio communication.

8. The method of claim 7 further comprising processing the at least two raw electronic audio signals to (a) filter sounds received from outside the angle and/or (b) to emphasize the sounds received from the angle.

9. The method of claim 8 further comprising:
   tracking a relative movement of the mouth in the video image over time; and
   adjusting the angle to match the relative movement of the mouth in the video image.

10. The method of claim 9 further comprising:
    ending the processing of the at least two raw electronic audio signals to filter the sounds received from outside the angle and/or to emphasize the sounds received from the angle when the mouth of the at least one person that is identified as the at least one source of the audio communication moves outside the video image.

11. The method of claim 9 wherein the first location information and the second location information each comprise part of a user interface.

12. The method of claim 11 further comprising:
receiving a first user input adjusting the first location information using a first portion of the user interface associated with the first location information; and
automatically adjusting the second location information and a second portion of the user interface associated with the second location information in response to the adjusting the first portion of the user interface.

13. The method of claim 12 wherein automatically adjusting the second location information comprises:
changing the angle; and
updating the display output.

14. The method of claim 12 wherein adjusting the first portion of the user interface associated with the first location information comprises adjusting the shape drawn around the mouth of the at least one person that is identified as the at least one source of the audio communication; and
wherein automatically adjusting second location information comprises updating the angle based on the second portion of the user interface associated with the shape drawn around the mouth.

15. The method of claim 12 wherein the first user input adjusting the second portion of the user interface associated with the second location information automatically adjusts the first portion of the user interface.

16. A mobile computing device comprising:
a processor;
a display output for outputting video image, wherein the display output is coupled to the processor;
at least two separate microphones, wherein the at least two separate microphones are coupled to the processor; and
a memory coupled to the processor, wherein the memory comprises instructions that, when executed by the processor, cause the processor to:
process the video image and an audio communication associated with the video image, wherein the audio communication comprises at least two raw electronic audio signals created from the at least two separate microphones, and wherein a relative position of the at least two separate microphones is known;
identify at least one source of the audio communication from the processing of the video image as part of a visual identification of the at least one source of the audio communication;
determine, based on the identifying of the at least one source of the audio communication, an angle from the mobile computing device to the at least one source of the audio communication; and
contemporaneously display, on the display output (1) first location information associated with the visual identification of the at least one source of the audio communication overlaid on the video image and (2) second location information comprising the angle from the mobile computing device to the at least one source of the audio communication.

17. The mobile computing device of claim 16 wherein the first location information comprises information identifying a person that is identified as the at least one source of the audio communication; and
wherein the angle from the mobile computing device is determined from a point associated with the at least two separate microphones.

18. The mobile computing device of claim 17 wherein identifying the person that is identified as the at least one source of the audio communication comprises:
identifying a first person as a first source of the audio communication;
identifying a second person as a second source of the audio communication;
wherein the first person is associated with (1) a first portion of the first location information associated with a visual identification of the first person overlaid on the video image and (2) a first portion of the second location information comprising the angle from the mobile computing device to the first person; and
wherein the second person is associated with (1) a second portion of the first location information associated with a visual identification of the second person overlaid on the video image and (2) a second portion of the second location information comprising a second angle from the mobile computing device to the second person.

19. A mobile computing device comprising:
means for processing video image and an audio communication associated with the video image, wherein the audio communication comprises at least two raw electronic audio signals created from at least two separate microphones, and wherein a relative position of the at least two separate microphones is known;
means for identifying at least one source of the audio communication from the processing of the video image as part of a visual identification of the at least one source of the audio communication;
means for determining, based on the identifying of the at least one source of the audio communication, an angle from the mobile computing device to the at least one source of the audio communication; and
means for contemporaneously displaying, on a display output of the mobile computing device (1) first location information associated with the visual identification of the at least one source of the audio communication overlaid on the video image and (2) second location information comprising the angle from the first mobile computing device to the at least one source of the audio communication.

20. The mobile computing device of claim 19 further comprising:
means for receiving a first user input adjusting the first location information using a first portion of a user interface associated with the first location information;
means for receiving a second user input adjusting the second location information using a second portion of the user interface; and
means for automatically adjusting the second location information when the first user input is received and for automatically adjusting the first location information when the second user input is received.

21. A method of visual and audio identification of a sound source comprising:
capturing, by a far-side mobile device, a far-side video image and a far-side audio communication, wherein the far-side audio communication comprises at least two raw electronic audio signals created from at least two separate microphones integrated as part of the far-side mobile device, and wherein a relative position of the at least two separate microphones is known;
communicating the far-side video image and the far-side audio communication from the far-side mobile device to a near-side mobile device via a network;

processing the far-side video image and the far-side audio communication to identify at least one source of the far-side audio communication as part of a visual identification of the at least one source of the far-side audio communication;

determining, based on the identifying of the at least one source of the far-side audio communication, at least one angle from the far-side mobile device to the at least one source of the far-side audio communication;

processing the at least two raw electronic audio signals to (a) filter sounds received from outside the at least one angle from the far-side mobile device to the at least one source of the far-side audio communication and/or (b) to emphasize sounds received from the at least one angle from the far-side mobile device to the at least one source of the far-side audio communication; and creating an output comprising (1) first far-side location information associated with the visual identification of the at least one source of the far-side audio communication overlaid on the far-side video image and (2) second far-side location information comprising the at least one angle from the far-side mobile device to the at least one source of the far-side audio communication.

22. The method of claim 21 wherein the determining of the at least one angle from the far-side mobile device to the at least one source of the far-side audio communication is performed by the far-side mobile device, and wherein the at least one angle from the far-side mobile device to the at least one source of the far-side audio communication is communicated from the far-side mobile device to the near-side mobile device with the far-side video image and the far-side audio communication.

23. The method of claim 21 wherein (1) processing the far-side video image and the far-side audio communication to identify at least one source of the far-side audio communication as part of a visual identification of the at least one source of the far-side audio communication is performed by the near-side mobile device after the near-side mobile device receives the far-side video image and the far-side audio communication.

24. The method of claim 23 wherein the near-side mobile device receives the relative position of the at least two separate microphones along with reception of the far-side audio communication.

25. The method of claim 24 wherein the first far-side location information and the second far-side location information each comprise part of a user interface presented on a display output of the near-side mobile device.

26. The method of claim 25 further comprising:
receiving a first near-side user input adjusting the first far-side location information using a first portion of the user interface associated with the first far-side location information.

27. The method of claim 26 further comprising:
automatically adjusting the second far-side location information and a second portion of the user interface associated with the second far-side location information in response to the adjusting the first portion of the user interface;

determining an updated at least one angle from the far-side mobile device to the at least one source of the far-side audio communication; and automatically adjusting processing the at least two raw electronic audio signals based on the updated at least one angle from the far-side mobile device to the at least one source of the far-side audio communication.

28. The method of claim 21 further comprising:
capturing, by the near-side mobile device, a near-side video image and a near-side audio communication, wherein the near-side audio communication comprises an additional at least two raw electronic audio signals created from an additional at least two separate microphones integrated as part of the near-side mobile device, and wherein a second relative position of the additional at least two separate microphones is known;

processing the near-side video image and the near-side audio communication to identify at least one source of the near-side audio communication as part of a visual identification of the at least one source of the near-side audio communication;

determining, based on the identifying of the at least one source of the near-side audio communication, the at least one angle from the near-side mobile device to the at least one source of the near-side audio communication; and creating a second output for the near-side mobile device comprising (1) first near-side location information associated with the visual identification of the at least one source of the near-side audio communication overlaid on the near-side video image and (2) second near-side location information comprising the at least one angle from the near-side mobile device to the at least one source of the near-side audio communication.

29. The method of claim 28 further comprising:
displaying the first near-side location information, the second near-side location information, the first far-side location information, and the second far-side location information in a display output of the near-side mobile device as part of a user interface of the near-side mobile device, wherein the at least one source of the far-side audio communication comprises a user of the far-side mobile device and wherein the at least one source of the near-side audio communication comprises a user of the near-side mobile device.

30. The method of claim 21 further comprising:
processing the at least two raw electronic audio signals prior to communicating the far-side audio communication from the far-side mobile device to the near-side mobile device;

receiving, at the far-side mobile device, a first far-side user input adjusting the first far-side location information using a first portion of a user interface associated with the first far-side location information; and adjusting the processing of the at least two raw electronic audio signals based on the first far-side user input.

* * * * *